United States Patent
He et al.

(10) Patent No.: US 10,470,035 B2
(45) Date of Patent: Nov. 5, 2019

(54) USER EQUIPMENT MANAGEMENT METHOD, DEVICE, AND SYSTEM

(71) Applicant: Huawei Technologies Co., Ltd., Shenzhen (CN)

(72) Inventors: Yongzhen He, Shenzhen (CN); Lianfang Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/586,489

(22) Filed: May 4, 2017

(65) Prior Publication Data

US 2017/0238168 A1    Aug. 17, 2017

Related U.S. Application Data

(63) Continuation of application No. PCT/CN2014/090297, filed on Nov. 5, 2014.

(51) Int. Cl.
*H04W 8/22* (2009.01)
*H04L 29/06* (2006.01)
(Continued)

(52) U.S. Cl.
CPC .............. *H04W 8/22* (2013.01); *H04L 29/06* (2013.01); *H04W 8/26* (2013.01); *H04W 12/08* (2013.01); *H04W 48/20* (2013.01)

(58) Field of Classification Search
CPC ......... H04W 8/22; H04W 8/26; H04W 12/08; H04W 48/20
See application file for complete search history.

(56) References Cited

U.S. PATENT DOCUMENTS 8,280,373 B2 * 10/2012 Huggett ................ H04L 63/101
455/411
8,688,808 B1 * 4/2014 Bennett, III ...... H04L 29/12066
709/220
(Continued)

FOREIGN PATENT DOCUMENTS

CN    101345988 A    1/2009
CN    101553022 A    10/2009
(Continued)

OTHER PUBLICATIONS

"3rd Generation Partnership Project; Technical Specification Group Core Network and Terminals; Numbering, Addressing and Identification (Release 12)," 3GPP TS 23.003 V12.4.1, Oct. 2014, 90 pages.
(Continued)

*Primary Examiner* — Mehmood B. Khan
(74) *Attorney, Agent, or Firm* — Slater Matsil, LLP

(57) ABSTRACT

A user equipment (UE) management method system and device, the method including obtaining, by a base station that stores a management list and that manages access to the base station by the UE, a UE type of the UE. The management list includes a UE type, a feature, and a home list. Each UE type corresponds to at least one feature. Each feature corresponding to each UE type corresponds to one home list. The home list indicates whether to allow UE of a type corresponding to the home list to execute a feature corresponding to the home list. The method further includes searching, by the base station according to the obtained UE type of the UE, the management list for a found feature and a found home list, and determining, according to the found home list, whether to allow the UE to execute the found feature.

20 Claims, 11 Drawing Sheets

| IMEI TAC | UE model | Home list | Feature |
|---|---|---|---|
| 35961601 | Model 1 | Black list 1 | DRX |
| 35961601 | Model 1 | Black list 2 | CA |
| 35961602 | Model 2 | White list 1 | PCI conflict detection |
| 35961603 | Model 3 | White list 2 | TM4 |

(51) Int. Cl.
*H04W 8/26* (2009.01)
*H04W 12/08* (2009.01)
*H04W 48/20* (2009.01)

(56) References Cited

U.S. PATENT DOCUMENTS

| | | | | |
|---|---|---|---|---|
| 2004/0120280 | A1* | 6/2004 | Western | H04L 1/0009 370/328 |
| 2005/0239448 | A1* | 10/2005 | Bayne | G06Q 30/02 455/414.3 |
| 2006/0009214 | A1* | 1/2006 | Cardina | H04W 8/22 455/432.3 |
| 2006/0256779 | A1* | 11/2006 | Lim | H04L 29/06027 370/352 |
| 2008/0167035 | A1* | 7/2008 | Buckley | H04W 4/18 455/435.1 |
| 2009/0286509 | A1* | 11/2009 | Huber | G06Q 20/1235 455/410 |
| 2009/0298470 | A1* | 12/2009 | Huber | H04L 63/101 455/411 |
| 2010/0165862 | A1* | 7/2010 | Nylander | H04L 41/12 370/252 |
| 2011/0002223 | A1* | 1/2011 | Gross | H04L 47/10 370/235 |
| 2011/0103314 | A1* | 5/2011 | Ahmadi | H04W 8/22 370/329 |
| 2011/0237250 | A1* | 9/2011 | Horn | H04W 8/20 455/433 |
| 2012/0163301 | A1* | 6/2012 | Jang | H04W 48/18 370/328 |
| 2012/0207130 | A1* | 8/2012 | Jang | H04W 8/24 370/331 |
| 2012/0309431 | A1* | 12/2012 | Bodog | H04W 16/18 455/456.6 |
| 2012/0327807 | A1* | 12/2012 | Eric | H04W 8/186 370/252 |
| 2013/0065555 | A1* | 3/2013 | Baker | G06Q 20/105 455/410 |
| 2013/0166678 | A1* | 6/2013 | Barak | H04L 67/303 709/217 |
| 2013/0178208 | A1* | 7/2013 | Dahlen | H04W 48/18 455/435.2 |
| 2013/0254395 | A1* | 9/2013 | Chen | H04W 12/08 709/225 |
| 2013/0347084 | A1* | 12/2013 | Malinowski | G06F 21/31 726/6 |
| 2014/0099928 | A1* | 4/2014 | Caldwell | H04W 48/02 455/411 |
| 2014/0160994 | A1* | 6/2014 | Garcia Martin | H04W 48/16 370/259 |
| 2014/0235258 | A1* | 8/2014 | Chen | H04W 4/60 455/452.1 |
| 2014/0313988 | A1 | 10/2014 | Hsu et al. | |
| 2015/0117213 | A1* | 4/2015 | Pinheiro | H04W 28/0284 370/235 |
| 2015/0237055 | A1* | 8/2015 | Canoy | H04L 63/101 726/1 |
| 2015/0256577 | A1* | 9/2015 | Gutierrez Vilaro | H04L 65/4084 709/203 |
| 2015/0334169 | A1* | 11/2015 | Hughes | H04W 4/80 709/204 |
| 2016/0014632 | A1* | 1/2016 | Siow | H04L 5/0085 370/230 |
| 2017/0135028 | A1* | 5/2017 | Lee | H04W 48/06 |
| 2018/0070306 | A1* | 3/2018 | Ang | H04W 28/0221 |
| 2018/0109992 | A1* | 4/2018 | Lee | H04W 4/90 |

FOREIGN PATENT DOCUMENTS

| | | |
|---|---|---|
| CN | 102573070 A | 7/2012 |
| CN | 103609153 A | 2/2014 |

OTHER PUBLICATIONS

"3rd Generation Partnership Project; Technical Specification Group Services and System Aspects; Telecommunication Management; Subscriber and Equipment Trace; Trace control and Configuration Management (Release 12)," 3GPP TS 32.422 V12.3.0, Sep. 2014, 136 pages.

"3rd Generation Partnership Project; Technical Specification Group Services and System Aspects; 3G Security; Security Architecture (Release 12)," 3GPP TS 33.102 V12.1.0, Jun. 2014, 76 pages.

"3rd Generation Partnership Project; Technical Specification Group Services and System Aspects; 3GPP System Architecture Evolution (SAE); Security Architecture (Release 12)," 3GPP TS 33.401 V12.12.0, Sep. 2104, 129 pages.

"3rd Generation Partnership Project; Technical Specification Group Radio Access Network; Evolved Universal Terrestrial Radio Access Network (E-UTRAN); S1 Application Protocol(S1AP) (Release 12)," 3GPP TS 36.413 V12.3.0, Sep. 2014, 290 pages.

Change Request, 36.413, CR 1179, Rev 3, Current Version 12.1.0, 3GPP TSG-RAN3#84 R3-141517, Seoul, Korea, May 19-23, 2014, 29 pages.

Change Request, 36.423, CR 0630, Rev 4, Current Version 12.1.0, 3GPP TSG-RAN3#84, R3-141518, Seoul, Korea, May 19-23, 2014, 17 pages.

"Provide IMEISV to eNB to Identify UE Characteristics," Source: TSG RAN WG3, Agenda Item: 11.9, 3GPP TSG RAN#63, RP-140906, Sophia Antipolis, France, Jun. 10-13, 2014, 1 page.

* cited by examiner

| UE type | Home list | Feature |
|---|---|---|
| Model 1 | Black list 1 | DRX |
| Model 1 | Black list 2 | CA |
| Model 2 | White list 1 | PCI conflict detection |
| Model 3 | White list 2 | TM4 |

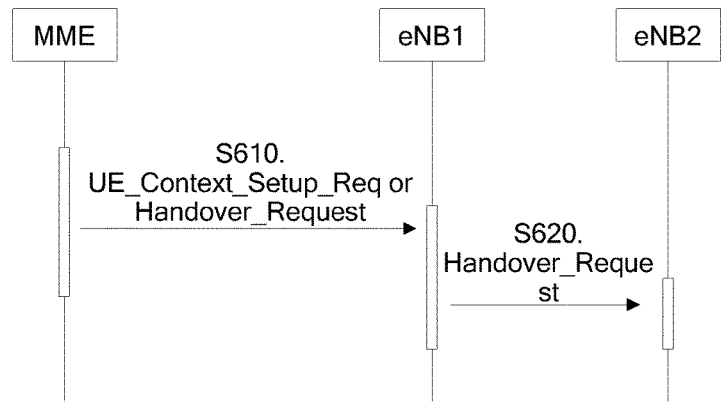
FIG. 6
| IMEI TAC | UE model | Home list | Feature |
|---|---|---|---|
| 35961601 | Model 1 | Black list 1 | DRX |
| 35961601 | Model 1 | Black list 2 | CA |
| 35961602 | Model 2 | White list 1 | PCI conflict detection |
| 35961603 | Model 3 | White list 2 | TM4 |
FIG. 7
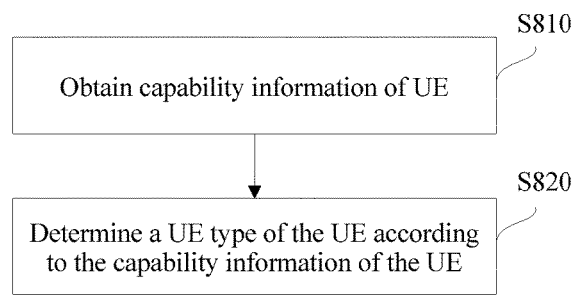
FIG. 8

USER EQUIPMENT MANAGEMENT METHOD, DEVICE, AND SYSTEM

CROSS-REFERENCE TO RELATED APPLICATIONS

This application is a continuation of International Application No. PCT/CN2014/090297, filed on Nov. 5, 2014, the disclosure of which is hereby incorporated by reference in its entirety.

TECHNICAL FIELD

Embodiments of the present invention relate to the field of communications technologies, and in particular, to a user equipment management method, a device, and a system.

BACKGROUND

With development of a Long Term Evolution (LTE) network and user equipment (UE), new features are continually launched, and new UEs are continually released. With the launch of the new features and the release of the new UEs, compatibility problems of the UEs increasingly emerge. Therefore, phenomena such as frequent abnormal call drops usually occur, and as a result, network performance is deteriorated, and user experience is poor.

Currently, when network problems such as abnormal call drops frequently occur, there is no effective resolution mechanism to resolve compatibility problems of UEs.

SUMMARY

In view of this, embodiments of the present invention provide a UE management method, a device, and a system, so as to effectively resolve a problem of UE.

According to a first aspect, a user equipment UE management method is provided, where the method is used by a base station to manage UE that accesses the base station, the base station stores a management list, the management list includes a UE type, a feature, and a home list, where each UE type corresponds to at least one feature, each feature corresponding to each UE type corresponds to one home list, and the home list is used to indicate whether to allow UE of a type corresponding to the home list to execute a feature corresponding to the home list; and the method includes obtaining, by the base station, a UE type of the UE, searching, by the base station according to the obtained UE type of the UE, the management list for a feature and a home list corresponding to the UE type, and determining, by the base station according to the home list corresponding to the found feature, whether to allow the UE to execute the found feature.

In a first possible implementation manner of the first aspect, the UE type of the UE is determined according to capability information of the UE, where the capability information of the UE includes a release, a category of a processing capability, a feature group indication, and frequency band information.

With reference to the first possible implementation manner of the first aspect, in a second possible implementation manner of the first aspect, the obtaining, by the base station, a UE type of the UE includes receiving, by the base station, the UE type of the UE sent by a network management device, where the UE type of the UE is determined by the network management device according to the capability information of the UE, or obtaining, by the base station, the capability information of the UE, and determining the UE type of the UE according to the capability information of the UE.

With reference to the first or the second possible implementation manner of the first aspect, in a third possible implementation manner of the first aspect, the capability information of the UE and capability information of another UE are collected by the network management device to form a capability information table.

With reference to the third possible implementation manner of the first aspect, in a fourth possible implementation manner of the first aspect, the capability information table is further stored on the base station, and the method further includes when the base station obtains the capability information of the UE from a live network, determining whether the capability information of the UE exists in the capability information table, and when the capability information of the UE does not exist in the capability information table, sending, by the base station, the capability information of the UE to the network management device.

With reference to the first aspect, in a fifth possible implementation manner of the first aspect, the obtaining a UE type of the UE includes receiving a masked international mobile station equipment identity and software version (IMEISV) of the UE that is sent by a core network device, and determining the UE type of the UE according to the Masked IMEISV.

With reference to the first aspect, in a sixth possible implementation manner of the first aspect, the obtaining a UE type of the UE includes requesting an international mobile station equipment identity IMEI from the UE.

With reference to any one of the first aspect, or the first to the sixth possible implementation manners of the first aspect, in a seventh possible implementation manner of the first aspect, the method further includes receiving, by the base station, the home list and the feature that are corresponding to the UE type and that are sent by the network management device, and generating, by the base station, the management list according to the home list and the feature corresponding to the UE type.

With reference to any one of the first aspect, or the first to the sixth possible implementation manners of the first aspect, in an eighth possible implementation manner of the first aspect, the method further includes receiving, by the base station, the management list sent by the network management device.

With reference to any one of the first aspect, or the first to the eighth possible implementation manners of the first aspect, in a ninth possible implementation manner of the first aspect, the method further includes recording, by the base station, a log of the UE, and sending, by the base station, a part or all of recorded logs to the network management device, so that the network management device determines, according to the part or all of the logs, the feature and the home list corresponding to the UE type in the management list.

With reference to the ninth possible implementation manner of the first aspect, in a tenth possible implementation manner of the first aspect, the log of the UE is obtained by executing a trace task, where the trace task is enabled by the base station based on the UE type of the UE, and the log of the UE is recorded in the trace task by the base station; or the trace task is enabled by the core network device based on the UE type of the UE, and a trace identifier is established by the core network device, so as to trigger, by using the trace identifier, the base station to record the log of the UE in the trace task.

With reference to any one of the first aspect, or the first to the tenth possible implementation manners of the first aspect, in an eleventh possible implementation manner of the first aspect, the home list in the management list includes a black list, and the feature corresponding to the home list includes a feature that is incompatible with the UE.

With reference to any one of the first aspect, or the first to the eleventh possible implementation manners of the first aspect, in a twelfth possible implementation manner of the first aspect, the home list in the management list includes a white list, and a feature corresponding to the white list includes a feature for improving user experience.

According to a second aspect, a device is provided, where the device is located in a base station and configured to manage user equipment UE that accesses the base station; and the device includes a memory, configured to store program code and a management list, where the management list includes a UE type, a feature, and a home list, each UE type corresponds to at least one feature, each feature corresponding to each UE type corresponds to one home list, and the home list is used to indicate whether to allow UE of a type corresponding to the home list to execute a feature corresponding to the home list, and a processor, configured to invoke the program code and the management list stored in the memory, so as to execute the method described in any one of the first aspect or the possible implementation manners of the first aspect.

According to a third aspect, a device is provided, where the device is located in a base station and configured to manage user equipment UE that accesses the base station; and the device includes a storage unit, configured to store a management list, where the management list includes a UE type, a feature, and a home list, each UE type corresponds to at least one feature, each feature corresponding to each UE type corresponds to one home list, and the home list is used to indicate whether to allow UE of a type corresponding to the home list to execute a feature corresponding to the home list, an obtaining unit, configured to obtain a UE type of the UE, a searching unit, configured to search, according to the UE type of the UE obtained by the obtaining unit, the management list stored in the storage unit for a feature and a home list corresponding to the UE type, and a determining unit, configured to determine, according to the home list corresponding to the feature found by the searching unit, whether to allow the UE to execute the found feature.

In a first possible implementation manner of the third aspect, the UE type of the UE is determined according to capability information of the UE, where the capability information of the UE includes a release, a category of a processing capability, a feature group indication, and frequency band information.

With reference to the first possible implementation manner of the third aspect, in a second possible implementation manner of the third aspect, the obtaining unit is configured to obtain the UE type of the UE by receiving the UE type of the UE sent by a network management device, where the UE type of the UE is determined by the network management device according to the capability information of the UE, or obtaining the capability information of the UE, and determining the UE type of the UE according to the capability information of the UE.

With reference to the first or the second possible implementation manner of the third aspect, in a third possible implementation manner of the third aspect, the capability information of the UE and capability information of another UE are collected by the network management device to form a capability information table.

With reference to the third possible implementation manner of the third aspect, in a fourth possible implementation manner of the third aspect, the storage unit is further configured to store the capability information table, and the device further includes a judging unit, configured to: determine whether the capability information of the UE that is obtained by the base station from a live network exists in the capability information table, and when the capability information of the UE does not exist in the capability information table, send the capability information of the UE to the network management device.

With reference to the third aspect, in a fifth possible implementation manner of the third aspect, the obtaining unit is configured to obtain the UE type of the UE in the following manner receiving a masked international mobile station equipment identity and software version Masked IMEISV of the UE that is sent by a core network device, and determining the UE type of the UE according to the Masked IMEISV.

With reference to the third aspect, in a sixth possible implementation manner of the third aspect, the obtaining unit is configured to obtain the UE type of the UE by requesting an international mobile station equipment identity IMEI from the UE.

With reference to any one of the third aspect, or the first to the sixth possible implementation manners of the third aspect, in a seventh possible implementation manner of the third aspect, the device further includes an establishment unit, configured to: receive the home list and the feature that are corresponding to the UE type and that are sent by the network management device, and establish the management list according to the home list and the feature corresponding to the UE type.

With reference to any one of the third aspect, or the first to the sixth possible implementation manners of the third aspect, in an eighth possible implementation manner of the third aspect, the device further includes an interface unit, configured to receive the management list sent by the network management device.

With reference to any one of the third aspect, or the first to the eighth possible implementation manners of the third aspect, in a ninth possible implementation manner of the third aspect, the device further includes a recording unit, configured to record a log of the UE, and send a part or all of recorded logs to the network management device, so that the network management device determines, according to the part or all of the logs, the feature and the home list corresponding to the UE type in the management list.

With reference to the ninth possible implementation manner of the third aspect, in a tenth possible implementation manner of the third aspect, the log of the UE is obtained by executing a trace task, the trace task is enabled by the recording unit based on the UE type of the UE, and the log of the UE is recorded in the trace task by the recording unit; or the trace task is enabled by the core network device based on the UE type of the UE, and a trace identifier is established by the core network device, so as to trigger, by using the trace identifier, the recording unit to record the log of the UE in the trace task.

With reference to any one of the third aspect, or the first to the tenth possible implementation manners of the third aspect, in an eleventh possible implementation manner of the third aspect, the home list in the management list includes a black list, and the feature corresponding to the home list includes a feature that is incompatible with the UE.

With reference to any one of the third aspect, or the first to the eleventh possible implementation manners of the third aspect, in a twelfth possible implementation manner of the third aspect, the home list in the management list includes a white list, and a feature corresponding to the white list includes a feature for improving user experience.

According to a fourth aspect, a user equipment UE management method is provided, including receiving, by a network management device, data of UE that is reported by a base station, analyzing, by the network management device, the data of the UE, and determining a home list and a feature corresponding to a UE type of the UE, and sending, by the network management device, the home list and the feature corresponding to the UE type to the base station, so that the base station establishes a management list according to the home list and the feature corresponding to the UE type; or establishing, by the network management device, a management list according to the home list and the feature corresponding to the UE type, and sending the management list to the base station.

With reference to the fourth aspect, in a first possible implementation manner of the fourth aspect, the home list in the management list includes a black list, and the feature corresponding to the home list includes a feature that is incompatible with the UE.

With reference to the fourth aspect, or the first possible implementation manner of the fourth aspect, in a second possible implementation manner of the fourth aspect, the home list in the management list includes a white list, and a feature corresponding to the white list includes a feature for improving user experience.

According to a fifth aspect, a user equipment UE management device is provided, where the device is located in a network management device, and includes a memory and a processor, where the memory is configured to store program code, and the processor invokes the program code stored in the memory, so as to execute receiving data of UE that is reported by a base station, analyzing the data of the UE, and determining a home list and a feature corresponding to a UE type of the UE, and sending the home list and the feature corresponding to the UE type to the base station, so that the base station establishes a management list according to the home list and the feature corresponding to the UE type, or establishing a management list according to the home list and the feature corresponding to the UE type, and sending the management list to the base station.

With reference to the fifth aspect, in a first possible implementation manner of the fifth aspect, the memory is further configured to store a capability information table, and the capability information table includes capability information of at least one UE.

With reference to the first possible implementation manner of the fifth aspect, in a second possible implementation manner of the fifth aspect, the processor is further configured to update the capability information table.

With reference to any one of the fifth aspect, or the first to the second possible implementation manners of the fifth aspect, in a third possible implementation manner of the fifth aspect, the home list in the management list includes a black list, and the feature corresponding to the home list includes a feature that is incompatible with the UE.

With reference to any one of the fifth aspect, or the first to the third possible implementation manners of the fifth aspect, in a fourth possible implementation manner of the fifth aspect, the home list in the management list includes a white list, and a feature corresponding to the white list includes a feature for improving user experience.

According to a sixth aspect, a computer program product is provided, including a computer readable medium, where the computer readable medium includes a group of program code used to execute the method described in any one of the first aspect or the possible implementation manners of the first aspect.

According to a seventh aspect, a communications system is provided, including: user equipment UE, a base station, and a network management device, where the base station includes the device described in any one of the second aspect, the third aspect, or the possible implementation manners of the third aspect.

It may be learned that, in the foregoing method, device, and system, a UE type is used to resolve a problem of UE, and a home list and a corresponding feature of each UE type are established based on the UE type. The home list indicates whether to allow UE of a type corresponding to the home list to execute a feature corresponding to the home list. Therefore, for a type of UE, a home list of a feature may be found, so as to forbid or allow this type of UE to execute the feature. In this way, a compatibility problem of the UE can be resolved effectively and rapidly.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 6 is a signaling flowchart of a manner of obtaining a UE type according to an embodiment of the present invention;

FIG. 7 is a schematic diagram of another management list according to an embodiment of the present invention;

FIG. 8 is a flowchart of a method for obtaining a UE type of UE according to an embodiment of the present invention;

DETAILED DESCRIPTION OF ILLUSTRATIVE EMBODIMENTS

To make the objectives, technical solutions, and advantages of the present invention clearer, the following clearly describes the technical solutions in the embodiments of the present invention with reference to the accompanying drawings. The described embodiments are a part rather than all of the embodiments of the present invention. All other embodiments obtained by a person of ordinary skill in the art based on the embodiments of the present invention without creative efforts shall fall within the protection scope of the present invention.

In consideration of increasing of a compatibility problem of UE, the present invention provides an effective solution to improve efficiency of resolving the problem of the UE, network performance, and user experience. In general, in the present invention, a UE type is used to resolve the problem of the UE, and a home list and a corresponding feature of each UE type are established based on the UE type. The home list indicates whether to allow UE of a type corresponding to the home list to execute a feature corresponding to the home list. Therefore, for a type of UE, a home list of a feature may be found, so as to forbid or allow this type of UE to execute the feature. In this way, a compatibility problem of the UE can be resolved effectively and rapidly.

Figures 1, 2:
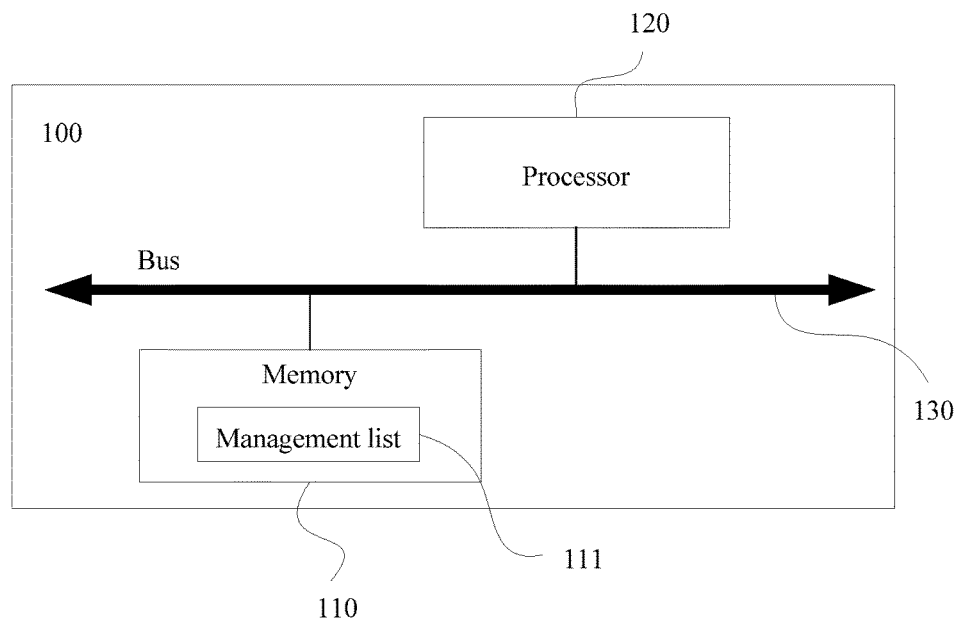
FIG. 1 is a schematic structural diagram of a UE management device according to an embodiment of the present invention.
FIG. 2 is a schematic diagram of a management list according to an embodiment of the present invention.

Referring to FIG. 1, FIG. 1 is a schematic structural diagram of a UE management device according to an embodiment of the present invention. The device is located on an access network side, for example, may be disposed in a base station, so as to manage UE that accesses the base station. As shown in FIG. 1, the device 100 includes a memory no and a processor 120, and the memory 110 and the processor 120 may be connected by using a bus 130. The memory 110 is configured to store a management list 111, and the management list 111 includes a UE type, a feature, and a home list, and indicates a correspondence among the UE type, the feature, and the home list. For example, each UE type corresponds to at least one feature, and each feature corresponding to each UE type corresponds to one home list. The processor 120 is configured to obtain a UE type of UE and search the management list 111 according to the obtained UE type, so as to obtain a home list of each feature corresponding to the UE type of the UE in the management list 111. In addition, the home list indicates whether to allow UE of a type corresponding to the home list to execute a feature corresponding to the home list. Therefore, the processor 120 may determine, according to a result of the searching, whether to allow the UE to execute a found feature. In this way, UE management can be implemented. When abnormal call drops frequently occur on the UE because the UE does not support some features, the UE may be controlled, by configuring a home list of the feature corresponding to the UE type of the UE, not to execute an operation related to the feature, and therefore, a problem occurrence probability of this type of UE can be greatly decreased.

It may be learned that, in the foregoing device, a UE type is used to resolve a problem of UE, and a home list and a corresponding feature of each UE type are established based on the UE type. The home list indicates whether to allow UE of a type corresponding to the home list to execute a feature corresponding to the home list. Therefore, for a type of UE, a home list of a feature may be found, so as to forbid or allow this type of UE to execute the feature. In this way, a compatibility problem of the UE can be resolved effectively and rapidly.

It should be noted that the memory 110 may be one storage apparatus, or may be a general term of multiple storage components, and the memory 110 is configured to store executable program code or a parameter, data and the like that are required when an access network management device operates. In addition, the memory 110 may include a random access memory (RAM), and may further include a non-volatile memory, for example, a magnetic disk memory or a flash.

The processor 120 may be one processor, or may be a general term of multiple processing components. For example, the processor may be a central processing unit (CPU), or may be an application-specific integrated circuit (ASIC), or may be one or more integrated circuits configured to implement embodiments of the present invention, for example, one or more microprocessors (DSP), or one or more field programmable gate arrays (FPGA).

The bus 130 may be an industry standard architecture (ISA) bus, a peripheral component interconnect (PCI) bus, an extended industry standard architecture (EISA) bus, or the like. The bus 130 may be categorized into an address bus, a data bus, a control bus, and the like. For ease of denotation, the bus is indicated by using only one thick line in the figure; however, it does not indicate that there is only one bus or only one type of bus.

A form of the management list is not limited in the present invention, provided that the management list can indicate a correspondence among the UE type, the feature, and the home list. Referring to FIG. 2, FIG. 2 provides a form, and this form is merely an example and is not intended to limit the present invention. As shown in FIG. 2, the UE type may be information such as a UE model or a type code. For example, the type code may be a type allocation code (TAC) of an international mobile station equipment identity (IMEI). Certainly, the UE type may be in another form, for example, a type index configured for each type of UE. The home list may be a black list, a white list, or a special list, for example, a very important person (VIP) list. The black list indicates that execution of a corresponding feature is forbidden, and the white list indicates that execution of a corresponding feature is allowed. The special list may be used to meet a special requirement. For example, to meet requirements of some users whose levels are relatively high, some features may be assigned to the very important person list, so as to ensure priorities of the users. The feature refers to a new technology introduced in a current network version relative to a previous network version and may be an improvement or a change of a technology, and this may cause a compatibility problem. Herein, the current network version refers to a currently used network version, and may be a latest version or may not be a latest version. The previous network version is a version relative to the current network version, and any version prior to the current network version may be referred to as the previous network version. Herein, an example of the feature includes discontinuous reception (DRX), carrier aggregation (CA), physical cell identifier (PCI) conflict detection, transmission mode (TM) 4, or the like. These are merely examples, content of the feature is not limited in the present invention, and any feature supported by the UE can be applied herein. In addition, FIG. 2 shows merely an example of a sequence of the UE type, the home list, and the feature in the list, and the sequence can be randomly adjusted provided that the correspondence does not change.

Figure 3:
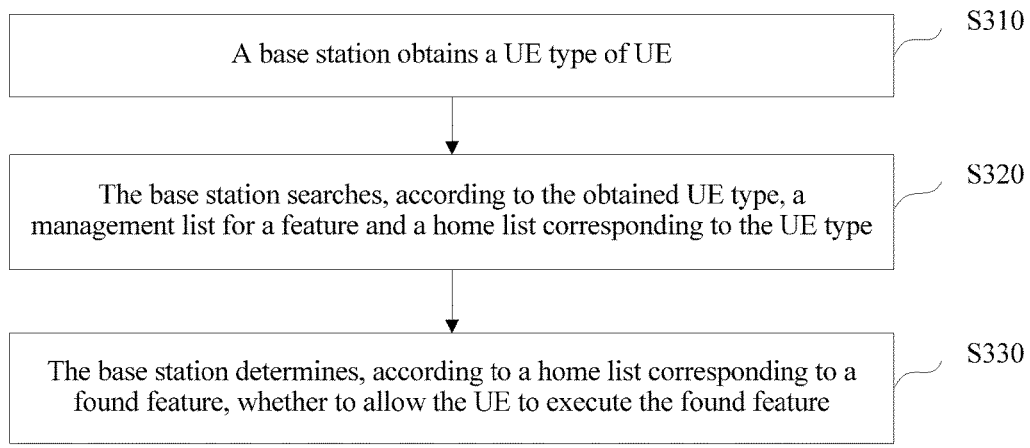
FIG. 3 is a flowchart of a UE management method according to an embodiment of the present invention.

Further referring to FIG. 3, the present invention further provides a UE management method, and the method is used by an access network device to manage UE. The access network device is a device that enables the UE to access a wireless network, and may be a device on an access network side in a different network standard, for example, a base station controller (BSC) or a base transceiver station (BTS) in a 2G network, a radio network controller (RNC), a Node B, or a home NodeB (HNB) in a 3G network, or an evolved NodeB (eNB) or a home eNodeB (HeNB) in an LTE network. These access network devices are collectively referred to as a base station in the following. That is, the base station in the present invention may be an access network device in any network standard.

Therefore, the UE management method is used by the base station to manage UE that accesses the base station. The base station stores a management list. Same as the description in the foregoing embodiment, the management list includes a UE type, a feature, and a home list, and indicates a correspondence among the UE type, the feature, and the home list. For example, each UE type corresponds to at least one feature, each feature corresponding to each UE type corresponds to one home list, and the home list indicates whether to allow UE of a type corresponding to the home list to execute a feature corresponding to the home list. As shown in FIG. 3, the UE management method includes the following steps.

S310. The base station obtains a UE type of UE.

S320. The base station searches, according to the obtained UE type of the UE, the management list for a feature and a home list corresponding to the UE type.

S330. The base station determines, according to the home list corresponding to the found feature, whether to allow the UE to execute the found feature.

It may be learned that, in the foregoing method, a UE type is used to resolve a problem of UE, and a home list and a corresponding feature of each UE type are established based on the UE type. The home list indicates whether to allow UE of a type corresponding to the home list to execute a feature corresponding to the home list. Therefore, for a type of UE, a home list of a feature may be found, so as to forbid or allow this type of UE to execute the feature. In this way, a compatibility problem of the UE can be resolved effectively and rapidly.

A description of the management list is the same as that in the foregoing embodiment, and details are not described herein.

Figure 4:
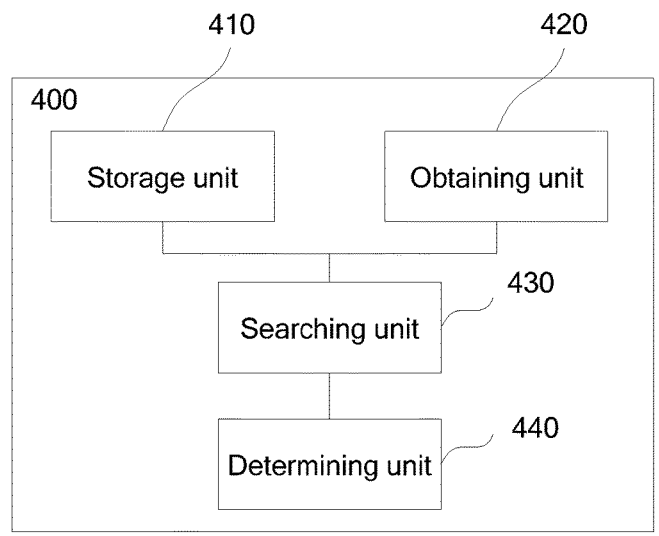
FIG. 4 is a schematic structural diagram of another UE management device according to an embodiment of the present invention.

Further referring to FIG. 4, an embodiment of the present invention further provides another UE management device, and the device is located on an access network side, for example, may be disposed in a base station, so as to manage UE that accesses the base station. As shown in FIG. 4, the device 400 includes a storage unit 410, an obtaining unit 420, a searching unit 430, and a determining unit 440. The storage unit 410 is configured to store a management list. Same as the description in the foregoing embodiment, the management list includes a UE type, a feature, and a home list, and indicates a correspondence among the UE type, the feature, and the home list. For example, each UE type corresponds to at least one feature, each feature corresponding to each UE type corresponds to one home list, and the home list indicates whether to allow UE of a type corresponding to the home list to execute a feature corresponding to the home list. The obtaining unit 420 is configured to obtain a UE type of UE; the searching unit 430 is configured to search, according to the UE type obtained by the obtaining unit 420, the management list stored in the storage unit 410 for a feature and a home list corresponding to the UE type; and the determining unit 440 is configured to determine, according to a home list corresponding to a feature found by the searching unit 430, whether to allow the UE to execute the found feature.

It may be learned that, in the foregoing device, a UE type is used to resolve a problem of UE, and a home list and a corresponding feature of each UE type are established based on the UE type. The home list indicates whether to allow UE of a type corresponding to the home list to execute a feature corresponding to the home list. Therefore, for a type of UE, a home list of a feature may be found, so as to forbid or allow this type of UE to execute the feature. In this way, a compatibility problem of the UE can be resolved effectively and rapidly.

A description of the management list is the same as that in the foregoing embodiment, and details are not described herein.

It should be noted that the storage unit 410 in this embodiment may be a memory. The obtaining unit 420, the searching unit 430, and the determining unit 440 may be processors that are separately disposed, or may be integrated into one processor of the base station, or may be stored in a memory of the base station in a form of program code, and functions of these units are invoked and executed by one processor of the base station. These units may be integrated together, or may be separately implemented. Herein, the processor may be one processor, or may be a general term of multiple processing components. For example, the processor may be a CPU, or may be an ASIC, or may be one or more integrated circuits configured to implement the embodiments of the present invention, for example, one or more DSPs or one or more FPGAs.

The following describes an obtaining manner of the UE type in detail with reference to an embodiment, and the obtaining manner of the UE type described in the following may be applied to any one of the foregoing embodiments.

For example, in a 2G or 3G network prior to an LTE network, the base station may obtain type information of UE. For example, in the 3G network, the RNC may obtain an IMEI by simulating and delivering a non-access stratum (NAS) message, and may further obtain a UE type of the UE based on the IMEI. Therefore, the obtaining manner of the UE type is well known by a person skilled in the art, and details are not described herein.

However, different from the 2G and 3G networks, in the LTE network, in consideration of information security, it is specified that an international mobile station equipment identity (IMEI) of UE is not learned by an access network side. In this way, an eNB cannot obtain an IMEI of UE that accesses the eNB, and therefore cannot obtain a type of the UE and cannot locate or resolve a problem by using the UE type. Therefore, when a problem occurs, it cannot be located or resolved in a timely manner, and this causes poorer user experience.

Figure 5:
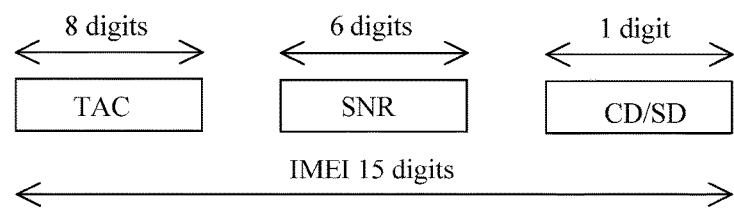
FIG. 5 is a schematic structural diagram of an international mobile station equipment identity (IMEI) according to an embodiment of the present invention.

Therefore, a new provision that allows a core network to send a modified IMEI to an eNB is introduced in an LTE protocol, so that the eNB learns a type of UE without violating an information security requirement. The modified IMEI is referred to as a Masked IMEISV, and the IMEISV is an abbreviation for international mobile station equipment identity and software version number. Referring to FIG. 5, FIG. 5 is a schematic structural diagram of an IMEI in the prior art. As shown in FIG. 5, the IMEI includes three parts: a type allocation code (TAC), a serial number (SNR), and a check digit/a spare digit (CD/SD). A length of the TAC is eight digits and may be used to indicate a type of UE. A length of the SNR is six digits, and an IMEISV is obtained by setting four bits on the right of the SNR to 1, so as to avoid an information security problem.

In this case, the base station obtains a UE type in the following manner: A device on a core network side, for example, a mobility management entity (MME), sends an IMEISV to the base station, so that the base station obtains TAC information of an IMEI. Referring to FIG. 6, the IMEISV may be sent to the base station by using an S1 Application Protocol (S1AP) message, or the IMEISV may be sent to the base station by using an X2 Application Protocol (X2AP) message.

As shown in FIG. 6, in step S610, when initially accessing a base station eNB1, UE may send an IMEISV to the eNB1 by using a UE context setup request (UE_Context_Setup_Req) message. An information element may be extended in the UE_Context_Setup_Req message to carry the IMEISV, so as to send the IMEISV to the base station eNB1; or when accessing the base station eNB1 by means of S1 handover, the UE may send the IMEISV to the eNB1 by using an S1AP handover request message. An information element may be extended in the Handover_Request message to carry the IMEISV, so as to send the IMEISV to the base station eNB1. In step S620, when accessing a base station eNB2 by means of X2 handover, the UE may send the IMEISV to the eNB2 by using an X2AP handover request (Handover_Request) message. An information element may be extended in the Handover_Request message to carry the IMEISV, so as to send the IMEISV to the base station eNB2.

Before an LTE protocol allows an MME to send an IMEISV to a base station, a UE type cannot be obtained in the foregoing manner. In addition, it takes a period of time to implement a new protocol in a product, and the UE type cannot be obtained in the foregoing manner during the period of time. In addition, the Masked IMEISV is an optional information element. Even if the LTE protocol allows an MME to send an IMEISV to a base station, it cannot be ensured that the base station can obtain a UE type.

Therefore, an embodiment of the present invention further provides the following manners to obtain a UE type.

In a manner, a base station requests an IMEI of UE from the UE. For example, when the UE performs initial access, an identification process is simulated to obtain the IMEI of the UE. For example, refer to a PCT patent application of the application No. PCT/CN2011/084308. Details are not described herein.

In the manner, an NAS message needs to be simulated and delivered, and the message needs to be parsed. Therefore, a compatibility risk may exist. In addition, in consideration of information security, the base station needs to store incomplete IMEI, and this easily causes a doubt about security.

Based on the foregoing consideration, the present invention provides another implementation manner of obtaining a UE type, that is, a manner in which a UE type of UE is determined by using capability information of the UE. After verification, the inventor finds that a type of UE may be basically determined by analyzing a capability of the UE. Although very few UEs of different types have a basically same capability, a problem of the UE can be located and resolved without being affected. Therefore, in the manner of determining the UE type by using the capability of the UE, the foregoing problems are better resolved. In addition, the type of the UE may be more accurately determined in the manner in combination with the obtainable TAC information in the IMEI of the UE. In this case, the foregoing management list may include two columns of UE types. As shown in FIG. 7, relative to the management list shown in FIG. 2, the management list includes two columns of UE type information: One column is UE models and the other column is IMEI TACs. Certainly, for UE whose IMEI TAC cannot be obtained, the first column may be left blank.

The capability information of the UE mainly includes three parts: release & category, a feature group indication, and frequency band information (Band Info). Release represents a protocol version of the UE, for example, R8 or R9. Category represents a processing capability, of the UE such as Cat4, Cat5, or Cat6, that mainly indicates a quantity of uplink-downlink resource blocks (RB) supported by the UE, and modulation and demodulation capabilities such as uplink 64 quadrature amplitude modulation (QAM). Feature Group Indication indicates which feature is supported by the UE, for example, DRX, inter-RAT automatic neighbor relation (ANR), semi-persistent scheduling, or transmission time interval bundling (TTI Bundling). Band Info includes a universal terrestrial radio access network (UTRAN), an evolved UTRAN (eUTRAN), and a GSM/an EDGE radio access network (Global System for Mobile Communications/Enhanced Data rates for GSM Evolution Radio Access Network, GERAN), and is used to indicate information of a band supported by the UE, for example, Band 1 or 5. The inventor finds that the UE type of the UE can be basically determined, such as a model of the UE, after the capability information of the UE is determined. A misjudgment probability of this manner of determining a UE type is extremely low. Even if there is misjudgment caused because very few UEs of different models have same capabilities, a problem of the UE can be resolved without being affected.

With reference to FIG. 8, the following describes in detail a method for determining a UE type by using a UE capability. As shown in FIG. 8, in this case, a process of determining a UE type of UE includes the following steps.

S810. Obtain capability information of the UE.

S820. Determine the UE type of the UE according to the capability information of the UE.

In the foregoing step S810, that is, in the process of obtaining the capability information of the UE, the capability information of the UE may be obtained by means of an interoperability test (IOT). In this case, the capability information of the UE obtained by means of the IOT test may be stored in a network management device, and the network management device then determines the UE type of the UE according to the capability information of the UE and sends the UE type of the UE to a base station; or the capability information of the UE may be sent to a base station, and the base station independently determines the UE type. However, in consideration of complexity of the base station, the former is preferable. In addition, the base station may obtain the capability information of the UE from a live network. For example, for UE that initially accesses the base station, the base station may obtain capability information of the UE by using a UE capability information message; and for UE that accesses the base station by means of handover, capability information of the UE may be obtained by using an X2AP or S1AP handover preparation message. In this case, the base station may obtain the capability information of the UE and determine a UE type of the UE according to the capability information of the UE. Alternatively, the base station may obtain the capability information of the UE and send the capability information of the UE to the network management device, and the network management device determines the UE type of the UE according to the capability information of the UE and sends the determined UE type to the base station. In addition, the manner of obtaining the capability information of the UE by means of the IOT test and the manner of obtaining the capability information of the UE from the live network may be combined. In this case, preferably, all the information is collected on the network management device, and the network management device determines the UE type of the UE according to the UE capability and sends the UE type to the base station.

For the foregoing step S820, that is, a process of determining the UE type of the UE according to the capability information of the UE, the inventor finds that after release & category, a feature group indication, and frequency band information in the capability information of the UE are obtained, the type of the UE can be basically determined according to the information, and a misjudgment probability is extremely low. Even if there is misjudgment caused because very few UEs of different models have same capabilities in these respects, a problem of the UE can be resolved without being affected.

The capability information of the UE may be stored in the network management device in a form of a capability information table, so as to facilitate collecting of capability information of multiple UEs and management for UEs in an entire network. Herein, the entire network refers to a network managed by the network management device. Therefore, after obtaining the capability information of the UE, the base station sends the capability information of the UE to the network management device, so that the network management device collects the capability information of the UE and capability information of another UE to form a capability information table.

Preferably, the network management device may send the capability information table to a base station managed by the network management device, so that after obtaining the capability information of the UE, the base station determines whether the capability information of the UE needs to be added to the existing capability information table, so as to complete updating the capability information table. For example, after obtaining the capability information of the UE, the base station determines whether the capability information of the UE exists in the capability information table. If the capability information of the UE exists, the table does not need to be updated; or if the capability information of the UE does not exist, the table needs to be updated. Whether the capability information of the UE exists in the local capability information table includes two meanings: Whether a capability information part of the UE has been established in the table; and whether the capability information part of the UE includes the capability information of the UE currently obtained by the base station. All the following descriptions include the meanings. Optionally, the capability information of the UE may be sent to the network management device by the base station, and the network management device updates the capability information table; or after updating the capability information table, the base station may send the capability information table to the network management device; or certainly, the base station and the network management device may perform respective updating, provided that the capability information table maintained by the base station is consistent with the capability information table maintained by the network management device.

Optionally, the network management device may not send the capability information table to the base station, and what is different from the manner of sending the capability information table to the base station is as follows: If the base station cannot obtain the capability information table, each time capability information of UE is obtained, the obtained information needs to be sent to the network management device, and the network management device determines whether the obtained capability information of the UE exists in a part corresponding to the UE in the capability information table and further decides whether to update the capability information table.

Generally, the capability information of the UE obtained by means of the IOT test is used to establish an initial capability information table. The capability information of the UE obtained from the live network may be used to update and supplement the capability information table. Certainly, the capability information table may be established and updated by using only the capability information of the UE obtained from the live network, instead of the capability information of the UE obtained by means of the IOT test. It should be noted that, for different UEs, obtaining manners may be different. For example, some UEs in the capability information table obtain capability information of the UEs by means of the IOT test, some UEs obtain capability information of the UEs by using only the live network, and this is not limited in the present invention.

Figure 9A:
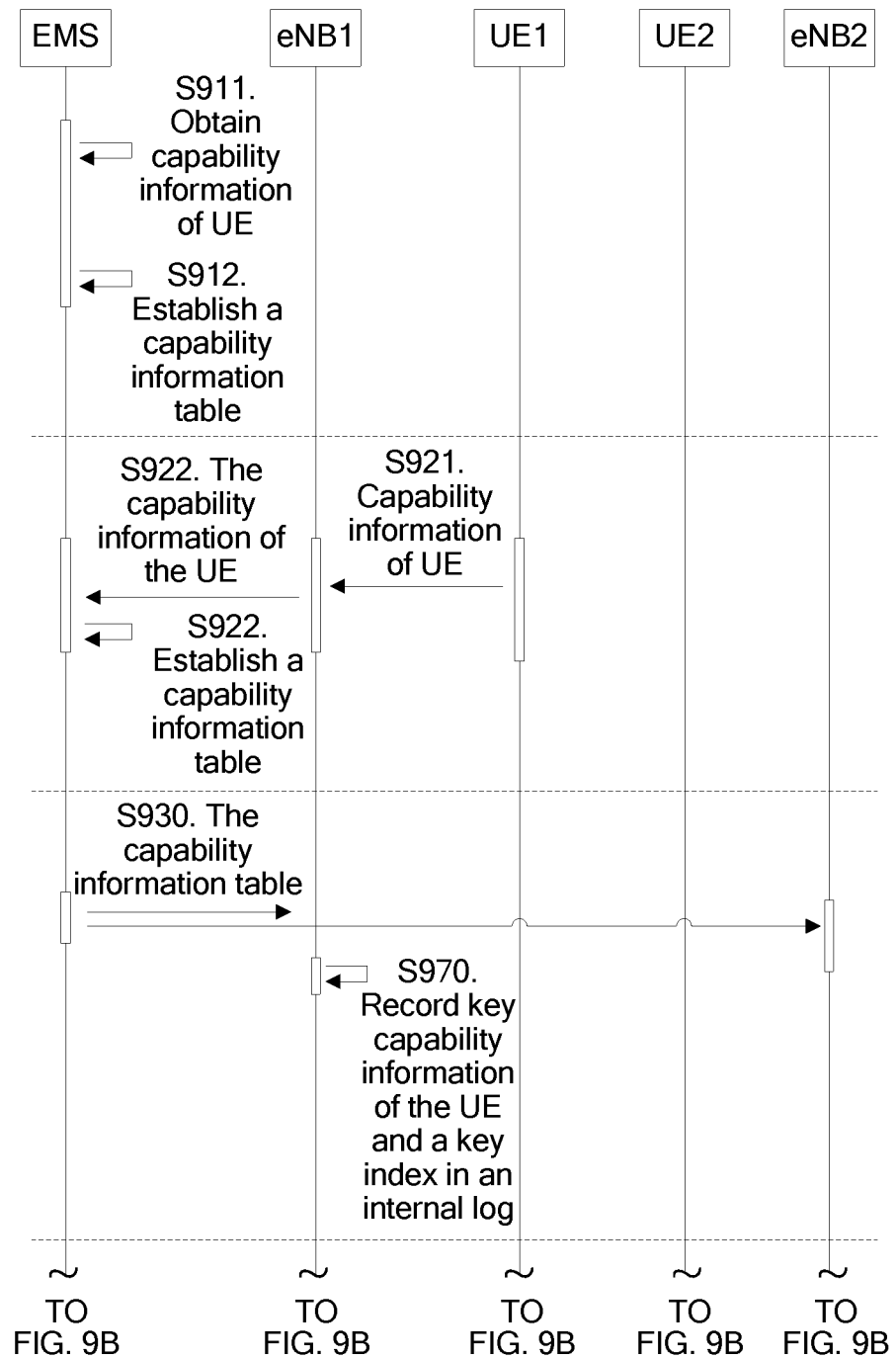
FIG. 9A, FIG. 9B, and FIG. 9C are a signaling flowchart of obtaining capability information of UE, and establishing and updating a capability information table according to an embodiment of the present invention.
Figure 9B:
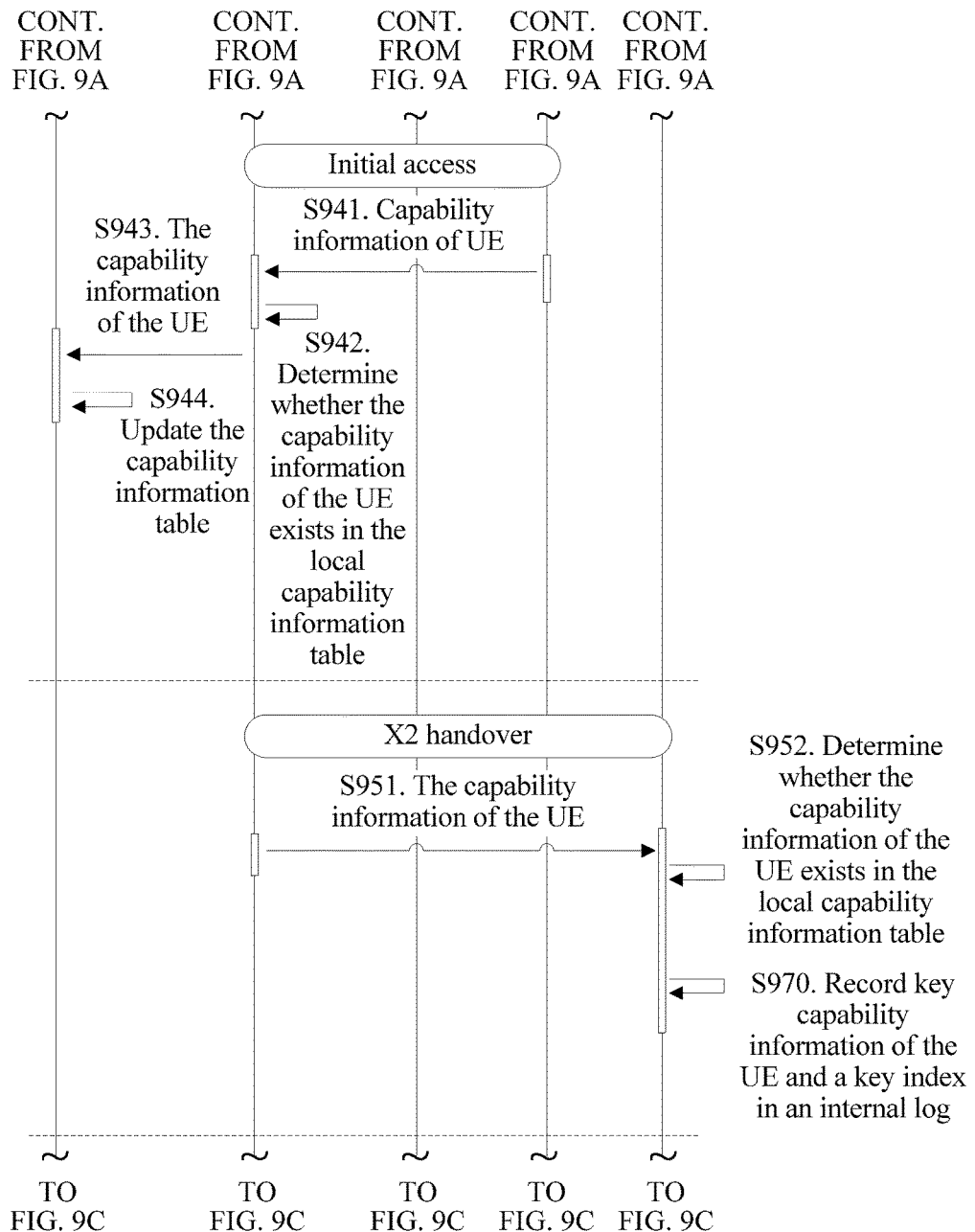
Figure 9C:
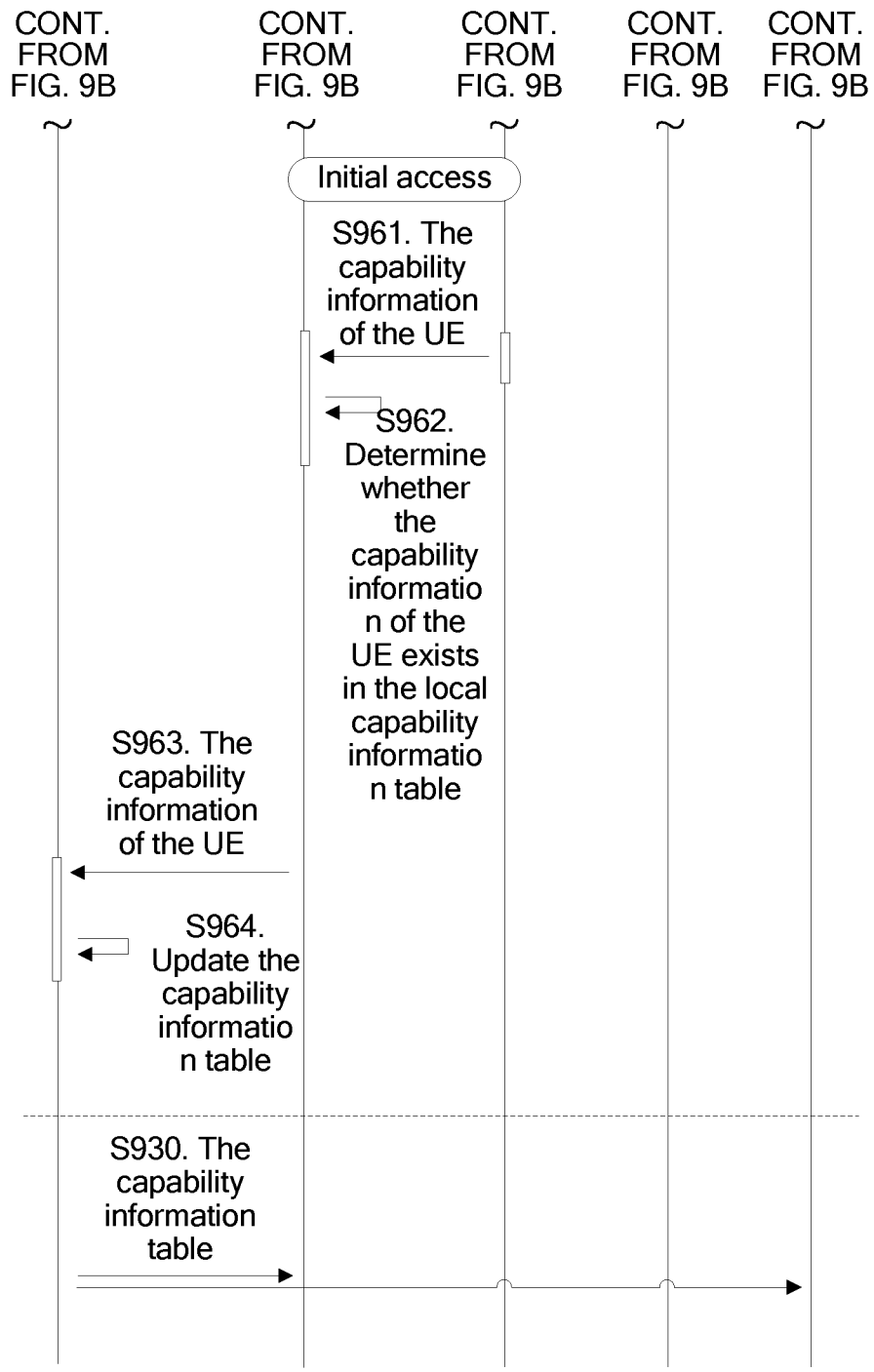

With reference to FIG. 9A, FIG. 9B, and FIG. 9C, the following describes several cases in which capability information of UE is obtained and a capability information table is established and updated. Herein, an LTE network is used as an example, and a case in another network is similar to that in the LTE network. In addition, a network management device is configured to maintain and manage a device on an access network side, and an element management system (EMS) is used as an example in this embodiment.

FIG. 9A, FIG. 9B, and FIG. 9C mainly show a capability information table establishing and updating process. The establishing process mainly includes the following two cases:

A first case: The capability information of the UE is obtained by means of an IOT test, and the capability information table is established based on the information. This includes the following steps.

S911. The network management device obtains the capability information of the UE. For example, the capability information of the UE obtained by means of the IOT test is imported to the network management device. The capability information of the UE obtained by means of the IOT test may be directly imported in a form of a table and used as an initial capability information table; or certainly, may not be imported in a form of a table, the network management device independently establishes the capability information table, and in this case, the following step S912 is further included.

S912. The network management device establishes the capability information table according to the obtained capability information of the UE.

It should be noted that, the foregoing steps are optional, that is, the capability information table may be established based on the capability information of the UE obtained by means of the IOT test; or may be established based on capability information of UE obtained from a live network, that is, the following second case:

The second case: The capability information of the UE is obtained from the live network, and the capability information table is established based on the information. This includes the following steps.

S921. The base station obtains the capability information of the UE. Herein, that the base station obtains the capability information of the UE from the live network may include but is not limited to the following scenarios.

When the UE initially accesses the base station, the UE may send the capability information of the UE to the base station by using a UE Capability Information message; or when the UE accesses the base station by means of S1 or X2 handover, the base station may obtain the capability information of the UE by using an X2AP or S1AP handover preparation message. When the UE accesses a target base station by means of the X2 handover, the capability information of the UE is sent to the target base station by a source base station; or when the UE accesses a target base station by means of the S1 handover, the capability information of the UE is sent to the target base station by an MME.

Herein, that an eNB1 obtains capability information of UE1 is used as an example for description, or certainly another base station and UE may be used as an example, for example, an eNB2 or another base station that is not shown in FIG. 9A, FIG. 9B, and FIG. 9C, and UE2 or another UE that is not shown in FIG. 9A, FIG. 9B, and FIG. 9C.

S922. Send the capability information of the UE to the network management device. Generally, the base station may send the capability information of the UE to the network management device by using an operation and maintenance (OM) channel.

S922. The network management device establishes the capability information table, where it is assumed that the network management device does not receive capability information of another UE before step S922. In addition, in this case, if only the capability information of the UE is received, when initially established, the capability information table includes only the capability information of the UE. If capability information of another UE is received at the same time, the capability information table includes all received capability information of UEs. In addition, in the table, capability information of each UE is corresponding to the UE of the capability information.

In either of the foregoing two cases, the capability information table establishing process is completed, and the initial capability information table is obtained. In this case, the following step S930 may be performed, so as to update the capability information table subsequently.

S930. The network management device sends the capability information table to a base station managed by the network management device. Herein, the eNB1 and the eNB2 are used as an example, and certainly, more base stations may be included. Generally, the network management device may send the capability information table to the base station by using the OM channel.

It should be noted that the foregoing step S930 may not be performed. What is different from a case in which S930 is performed is as follows: Each time the base station obtains capability information of UE, the base station needs to send the information to the network management device, and the network management device determines whether to perform updating. This has been described in the above, and details are not described herein.

Further referring to FIG. 9A, FIG. 9B, and FIG. 9C, the capability information table updating process mainly includes the following cases:

A first case: A case in which the UE initially accesses the base station includes the following steps.

S941. When the UE initially accesses the base station, the UE sends the capability information of the UE to the base station. For example, the UE may send the capability information of the UE to the base station by using a UE Capability Information message.

Herein, that the UE2 initially accesses the eNB1 is used as an example, or certainly another UE or base station may be used as an example. For example, the UE2 initially accesses the eNB2.

When the foregoing step S930 has been performed, the following step S942 is performed, otherwise, step S943 is performed.

S942. The base station determines whether the capability information of the UE exists in the local capability information table. If the capability information of the UE exists, the capability information table does not need to be updated, and the capability information of the UE does not need to be sent to the network management device. If the capability information of the UE does not exist, step S943 is performed.

S943. The base station sends the capability information of the UE to the network management device. Generally, the base station may send the capability information of the UE to the network management device by using the OM channel.

S944. The network management device updates the capability information of the UE sent by the base station to the capability information table.

A second case: A case in which the UE accesses the base station by means of handover includes the following steps.

The UE may access the base station by means of the X2 handover, or may access the base station by means of the S1 handover. Herein, that the UE1 accesses the eNB2 by means of the X2 handover is used as an example for description, or certainly another handover form and another UE or base station may be used as an example. For example, the UE2 accesses the eNB2 by means of the S1 handover.

S951. A source base station sends the capability information of the UE to a target base station. For example, the source base station may send the capability information of the UE to the target base station by using an X2AP handover preparation message.

When the foregoing step S930 has been performed, the following step S952 is performed. Otherwise, the base station sends the capability information of the UE to the network management device, and the network management device decides whether to update the capability information table.

S952. The target base station determines whether the capability information of the UE sent by the source base station exists in the local capability information table. If the capability information of the UE exists, the capability information table does not need to be updated, and the capability information of the UE does not need to be sent to the network management device. If the capability information of the UE does not exist, the capability information of the UE needs to be sent to the network management device.

Herein, because the capability information of the UE exists in the capability information table, the capability information of the UE does not need to be sent to the network management device.

A third case: A case in which the UE initially accesses the base station again after updating the capability of the UE includes the following steps.

S961. When the UE initially accesses the base station, the UE sends the capability information of the UE to the base station.

Herein, that the UE1 initially accesses the eNB1 again after updating the capability is used as an example, or certainly another UE or base station may be used as an example. For example, the UE2 initially accesses the eNB1 again.

When the foregoing step S930 has been performed, the following step S962 is performed; otherwise, step S963 is performed.

S962. The base station determines whether the capability information of the UE exists in the local capability information table. If the capability information of the UE exists, the capability information table does not need to be updated, and the capability information of the UE does not need to be sent to the network management device. If the capability information of the UE does not exist, step S963 is performed.

S963. The base station sends the capability information of the UE to the network management device.

S964. The network management device updates the capability information of the UE sent by the base station to the capability information table.

In the foregoing three cases, if the capability information table is updated, optionally, the foregoing step S930 may be performed. For example, after step S944 and step S964 are performed, optionally, step S930 may be performed. That is, the network management device may send the updated capability information table to a base station managed by the network management device. Advantages and disadvantages of performing or not performing step S930 have been described in the above, and details are not described herein.

Preferably, after learning the capability information of the UE, the base station may record key capability information of UE and an index in an internal log. The index is a serial number created for each UE capability, so as to facilitate access for a machine (the network management device or the base station). That is, the following step S970 is performed, so as to facilitate tracing of the UE capability and locating of a problem of the UE in a timely manner.

S970. The base station records the key capability information of the UE and the index in the internal log.

The base station may perform step S970 after obtaining the capability information of the UE in any manner, for example, after the base station receives the capability information table sent by the network management device, or after step S930 is performed; or after the base station obtains the capability information of the UE from the live network, for example, after step S951 is performed. Although an example of performing step S970 is provided in the figure only after step S930 or step S951 is performed, this is not intended to limit the present invention. Step S970 may be performed after the capability information of the UE is obtained in any manner, for example, after step S921, step S941, or step S961 is performed. A person skilled in the art may perform selection according to a requirement, and this is not limited in the present invention.

The base station records the key capability information of the UE and the index in the internal log, and therefore can record operating conditions of capabilities of UEs in real time. Once a problem is found, the internal log can be invoked to locate the problem of the UE.

Preferably, the UE type may be used to locate the problem of the UE. In addition, locating of the problem of the UE is applicable to any one of the foregoing embodiments, and a home list of some features of the UE may be determined according to the located problem of the UE. The following provides a detailed description with reference to an embodiment.

Figure 10:
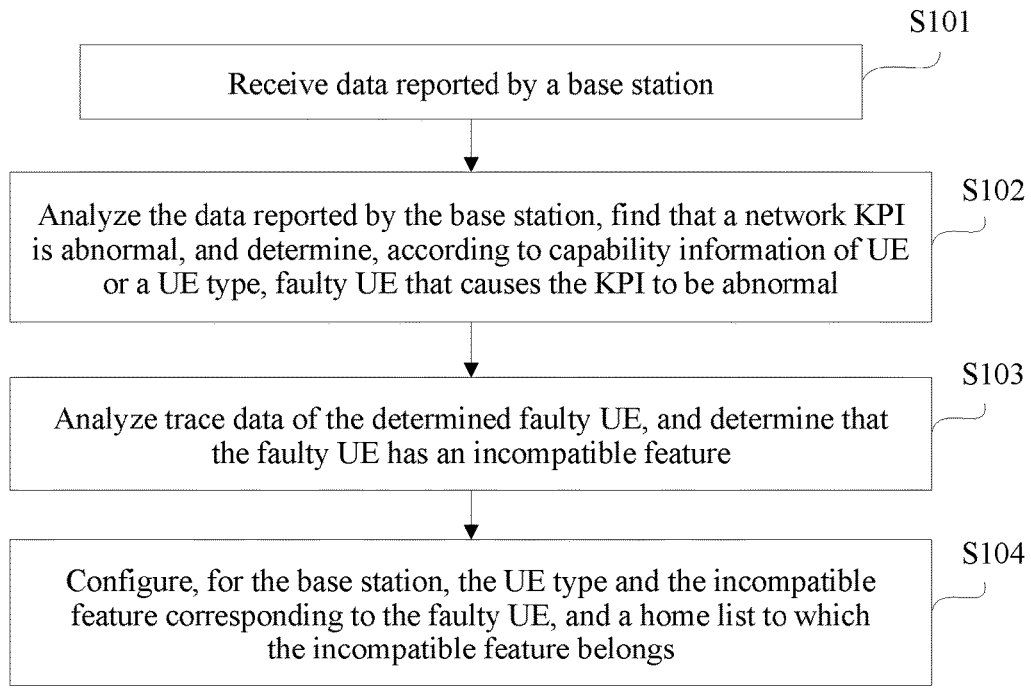
FIG. 10 is a schematic flowchart of another UE management method according to an embodiment of the present invention.

Referring to FIG. 10, FIG. 10 is a UE management method according to an embodiment of the present invention. The method is used to locate and resolve a problem of UE. As shown in FIG. 10, the method is performed by a network management device and includes the following steps.

S101. Receive data reported by a base station.

S102. Analyze the data reported by the base station, find that a network key performance indicator (KPI) is abnormal, and determine, according to capability information of UE or a UE type, faulty UE that causes the KPI to be abnormal.

S103. Analyze trace data of the determined faulty UE, and determine that the faulty UE has an incompatible feature.

S104. Configure, for the base station, a UE type and the incompatible feature corresponding to the faulty UE, and a home list to which the incompatible feature belongs, where the home list of the incompatible feature is a black list.

It may be learned that by using the foregoing method, an incompatibility problem of UE can be located, and a feature that causes the incompatibility problem is configured for a base station in a form of a black list, so as to facilitate management for the UE by the base station.

Generally, for each UE that accesses the base station, the base station performs standard interface tracing and detailed tracing for internal signaling and the like, and records traced data in the internal log. The base station may regularly report the data in the internal log to the network management device, so as to facilitate maintenance of the network by the network management device.

After receiving the data reported by the base station, the network management device may analyze the data, so as to check whether the network KPI is normal in a timely manner. The KPI mainly includes an access success rate, a call drop rate, a handover success rate (which includes intra-RAT intra-frequency or inter-frequency handover, and inter-RAT handover), a user uplink-downlink throughput rate, and the like. When the network KPI is abnormal, based on a UE type or capability information of UE, the network management device may find that a problem mainly occurs on one UE, some UEs, or a type of UE, and lock the UE, the UEs, or the type of UE as faulty UE or faulty UEs. Then, by analyzing trace data of the faulty UE, it is found that a problem occurs when the UE runs a feature, and the feature is determined as an incompatible feature of the faulty UE. Herein, the trace data further includes data obtained by continuously tracing the UE after the UE is determined as faulty UE. Further, the feature is sent to the base station, and a home list of the feature is also sent to the base station. The two types of information may be simultaneously sent, for example, may be simultaneously sent after the faulty UE and the incompatible feature are located; or may be sent separately, for example, the home list is sent after the faulty UE is located, and the feature corresponding to the home list is then sent after the incompatible feature is located. Then, the base station may establish the above management list according to the feature and the home list that are sent by the network management device. Certainly, the network management device may establish the management list after the faulty UE and the incompatible feature are located, and send the management list to the base station.

For example, after finding that the KPI is abnormal, the network management device finds, by analyzing the data reported by the base station, that call drops frequently occur on a type of UE, and determines the type of UE as faulty UE; and by continuously tracing the type of UE and analyzing trace data, finds that each call drop of the type of UE occurs in a short time after DRX is performed, and determines that an incompatible feature of the type of UE is a DRX feature. Therefore, for the type of UE, the base station may deliver information in which a home list is a black list and a feature is the DRX feature. For the type of UE, one black list may be sent after the faulty UE is determined, and for the type of UE, a feature corresponding to the previously sent black list may be sent after the incompatible feature is located. Certainly, the black list and the incompatible feature may be simultaneously sent after the faulty UE and the incompatible feature are both located, or an established management list may be sent.

Figure 11:
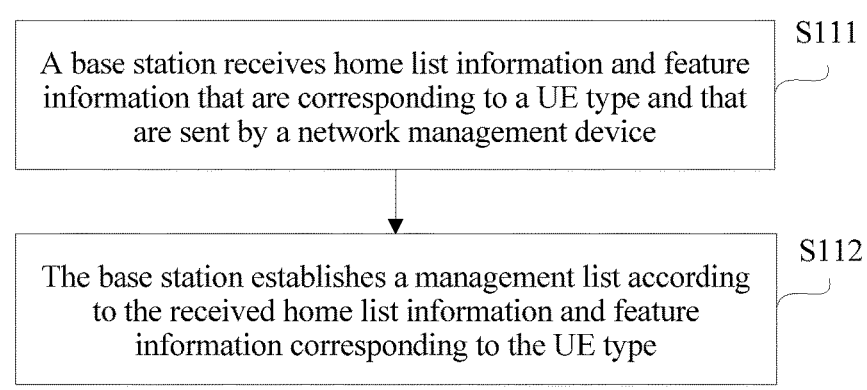
FIG. 11 is a flowchart of a method for establishing a management list according to an embodiment of the present invention.

It may be learned that the management list in the foregoing embodiment may be established by the base station or the network management device. Referring to FIG. 11, when the management list is established by the base station, an establishing process includes the following steps.

S111. The base station receives a home list and a feature that are corresponding to a UE type and that are sent by the network management device, where the home list and the feature may be simultaneously sent, or may be separately sent.

S112. The base station establishes the management list according to the received home list and feature corresponding to the UE type.

The foregoing step S111 is implemented in any one of the following manners:

In a first manner, the base station receives the home list sent by the network management device, and the home list refers to a home list corresponding to the UE type; and the base station receives the feature sent by the network management device, and the feature refers to a feature corresponding to each home list corresponding to the UE type.

In a second manner, the base station receives the feature sent by the network management device, and the feature refers to a feature corresponding to the UE type; and the base station receives the home list sent by the network management device, and the home list refers to a home list corresponding to each feature corresponding to the UE type.

It may be learned that an incompatibility problem of UE can be managed by using a black list in a management list. In addition, a white list may be configured in the management list, and the white list is mainly used for provisioning of some features, so as to better improve user experience on a network.

Figure 12:
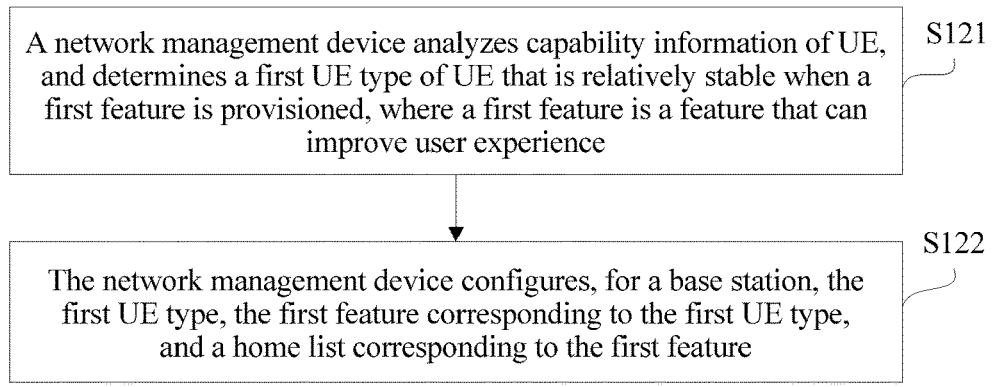
FIG. 12 is a schematic flowchart of another UE management method according to an embodiment of the present invention.

Referring to FIG. 12, FIG. 12 is a UE management method according to an embodiment of the present invention. The method is used to specially provision a feature or some features, so as to improve user experience. As shown in FIG. 12, the method is performed by a network management device and includes the following steps.

S121. The network management device analyzes capability information of UE, and determines a first UE type of UE that is relatively stable when a first feature is provisioned, where the first feature is a feature that can improve user experience.

S122. The network management device configures, for a base station, the first UE type, the first feature corresponding to the first UE type, and a home list corresponding to the first feature, where the home list is a white list.

For example, in consideration of call set-up duration and stability, it is advised to use circuit switched fallback (CSFB) to improve voice quality. However, currently, inter-RAT measurement of many UEs is inaccurate, and this causes a handover failure. Therefore, by using the foregoing solution of the present invention, a type of UE that can better support a CSFB feature may be determined by analyzing capability information of the UE. Therefore, a home list of the CSFB feature of the UE is configured as a white list, and the UE can provision the feature, so as to improve user experience.

In addition, whether some features are selected into a white list and some features are selected into a black list may be determined according to maturity of the features in the market or a requirement of an operator, and this is not limited in the present invention.

When the network management device locates a problem of the UE, trace data of the UE is required. In the present invention, the UE type may be used in a process of tracing the UE, to improve correlation between the trace data and the UE type, so as to more rapidly select required data to locate the problem of the UE.

In the following, that tracing is performed based on an IMEISV or an IMEI TAC is used as an example to describe a tracing process. Based on this, a person skilled in the art can perform tracing by using another piece of type information of the UE, and this is not limited in the present invention.

A trace task may be established on a core network side or an access network side. The following uses an LTE network as an example for description, and a case in a network of another standard is similar to a case in the LTE network.

Figure 13:
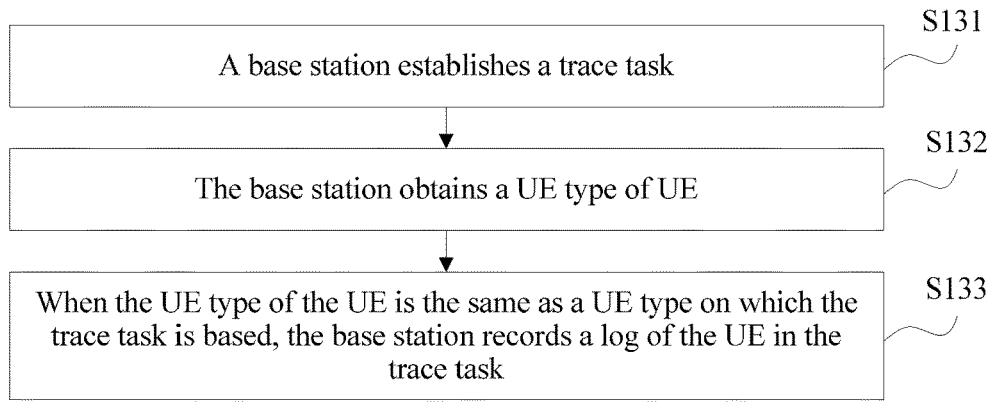
FIG. 13 is a flowchart of a tracing method according to an embodiment of the present invention.

Manner 1: Referring to FIG. 13, a trace task is established on a base station, and the following steps are mainly included:

S131. The base station establishes a trace task, where the trace task is based on a UE type, for example, an IMEISV or an IMEI TAC. The trace task is mainly used to trace a standard interface, internal signaling, or the like.

S132. The base station obtains a UE type of UE.

For example, the UE type may be an IMEISV or an IMEI TAC, or certainly may be another UE type described in the above, such as a UE model.

S133. When the UE type of the UE is the same as the UE type on which the trace task is based, the base station records a log of the UE in the trace task.

Figure 14:
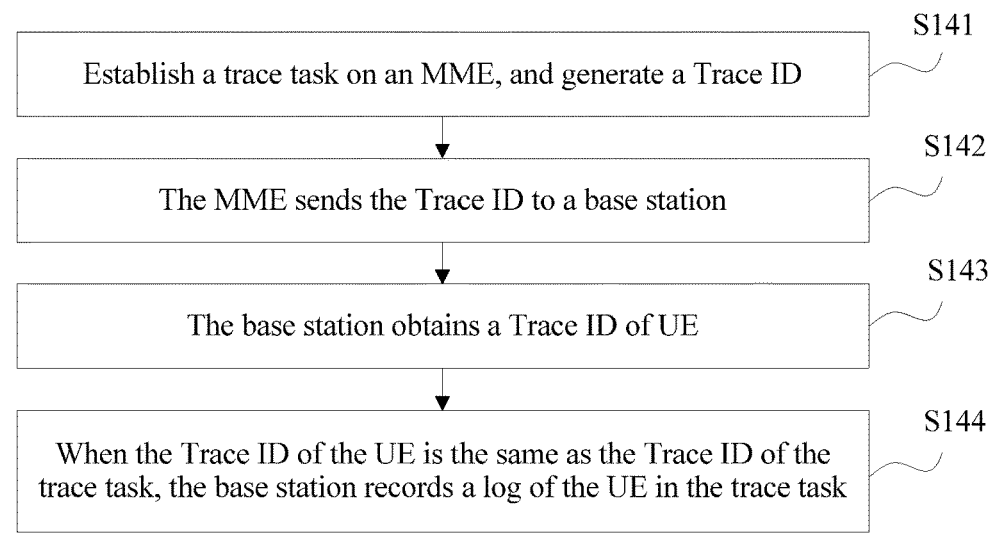
FIG. 14 is a flowchart of another tracing method according to an embodiment of the present invention.

Manner 2: Referring to FIG. 14, a trace task is initiated on an MME, and the following steps are mainly included:

S141. Establish a trace task on the MME, and generate a trace reference identifier (Trace Reference ID), which is referred to as a Trace ID, where the trace task is based on a UE type, for example, an IMEISV or an IMEI TAC.

S142. The MME sends the Trace ID to a base station. For example, the Trace ID is sent to the base station by using a trace activation information element (Trace Activation IE), so as to instruct the base station to enable tracing. The trace activation information element may be carried in a message such as an initial UE context request, a handover request, or trace start.

S143. The base station obtains a Trace ID of UE.

S144. When the Trace ID of the UE is the same as the Trace ID of the trace task, the base station records a log of the UE in the trace task.

It should be noted that both the foregoing two manners may be configured by using an element management device, and a person skilled in the art can select a required trace task enabling manner according to a requirement. In addition, another manner may be used, and this is not limited in the present invention.

It has been described previously that the foregoing descriptions of the manner of obtaining the UE type and the manner of locating a problem of the UE by using the UE type are applicable to any one of the embodiments of FIG. 1, FIG. 3, and FIG. 4.

For example, further refer to FIG. 1. Manners of obtaining a UE type of UE by a processor 120 may include but are not limited to the following types:

In a first manner, the processor 120 directly obtains the UE type of the UE from a network management device or independently determines the UE type of the UE. The UE type of the UE is determined according to capability information of the UE. In addition, same as the foregoing descriptions, the capability information of the UE includes a release, a category of a processing capability, a feature group indication, and frequency band information.

When the processor 120 directly obtains the UE type of the UE from the network management device, the UE type is determined by the network management device according to the capability information of the UE, and the capability information of the UE is obtained from a live network and sent to the network management device by a base station; or the capability information of the UE is obtained by means of an IOT test and imported to the network management device; or both the foregoing two manners are used, that is, a part of the capability information of the UE is obtained by means of an IOT test and imported to the network management device, and a rest part is obtained from a live network and sent to the network management device by a base station.

When the base station independently determines the UE type of the UE by using the processor 120, the processor 120 determines the UE type according to the capability information of the UE, and the capability information of the UE may be obtained by the base station from the live network; or the network management device may send the capability information of the UE obtained by means of the IOT test to the base station; or certainly, the foregoing two manners may be combined, that is, the base station obtains a part of the capability information of the UE from the live network, and a rest part of the capability information of the UE is obtained by the base station from the network management device.

Generally, the base station may obtain the capability information of the UE from the live network by using one or both of the following messages: a UE capability information message in a process in which the UE initially accesses the base station and a handover preparation message in a process in which the UE accesses the base station by means of handover. For example, when the UE initially accesses the base station, the base station may receive, by using an air interface between the base station and the UE, the UE Capability Information message that carries the capability information of the UE; or when the UE accesses the base station by means of X2 handover, the base station may receive the capability information of the UE by using an X2 interface between the base station and a source base station; or when the UE accesses the base station by means of S1 handover, the base station may receive the capability information of the UE by using an S1 interface between the base station and an MME.

In a second manner, when a core network is allowed to deliver an IMEISV, the processor 120 may receive the IMEISV sent by a core network device and determine the UE type of the UE according to the Masked IMEISV.

In a third manner, the processor 120 may directly request an IMEI from the UE.

Each manner is the same as that of the foregoing descriptions, and details are not described herein.

In addition, same as the foregoing descriptions, the network management device may collect capability information of multiple UEs to form a capability information table, and the network management device may send the table to the base station, so as to store the table in a memory 110. In this case, the processor 120 may be further configured to execute the following operations: when the capability information of the UE is obtained from the live network, determining whether the capability information of the UE exists in the capability information table; and when the capability information of the UE does not exist in the capability information table, sending the capability information of the UE to the network management device. In this way, the network management device can update the capability information table and maintain capability information of each UE.

In addition, same as the foregoing descriptions, a management list 111 may be established by the base station according to information delivered by the network management device, or may be directly delivered to the base station by the network management device.

When the base station establishes the management list 111, the processor 120 is further configured to: receive a home list and a feature that are corresponding to the UE type and that are sent by the network management device; and establish the management list 111 according to the home list and the feature corresponding to the UE type. The home list and the feature may be simultaneously sent, or may be successively sent, and sending order is not limited. For example, the processor 120 may first receive the home list sent by the network management device, and the home list refers to a home list corresponding to the UE type; and the processor 120 may then receive the feature sent by the network management device, and the feature refers to a feature corresponding to each home list corresponding to the UE type. Certainly, the processor 120 may first receive the feature sent by the network management device, and the feature refers to a feature corresponding to the UE type; and the processor 120 may then receive the home list sent by the network management device, and the home list refers to a home list corresponding to each feature corresponding to the UE type.

When the network management device establishes the management list in, the processor 120 is further configured to receive the management list sent by the network management device.

Generally, the processor 120 may receive, by using an operation and maintenance channel between the base station and the network management device, the home list and the feature that are corresponding to the UE type and that are sent by the network management device, or the management list sent by the network management device.

Optionally, the processor 120 may be further configured to: record a log of the UE, and send a part or all of the recorded log to the network management device, so that the network management device determines, according to the part or all of the log, the feature and the home list corresponding to the UE type in the management list. That is, after the processor 120 records the log of the UE and sends the log to the network management device, the network management device may locate a problem of the UE according to the log, so as to configure the feature and the home list that need to be configured for the UE type of the UE.

Generally, the log of the UE may be obtained by executing a trace task. The trace task may be enabled by the base station based on the UE type of the UE, and the log of the UE is recorded in the trace task by the base station; or the trace task is enabled by the core network device based on the UE type of the UE, and a trace identifier is established by the core network device, so as to trigger, by using the trace identifier, the base station to record the log of the UE in the trace task.

For another example, further refer to FIG. 4. Manners of obtaining a UE type of UE by an obtaining unit 420 may include but are not limited to the following types:

In a first manner, the obtaining unit 420 directly obtains the UE type of the UE from a network management device or independently determines the UE type of the UE. The UE type of the UE is determined according to capability information of the UE. In addition, same as the foregoing descriptions, the capability information of the UE includes a release, a category of a processing capability, a feature group indication, and frequency band information.

When the obtaining unit 420 directly obtains the UE type of the UE from the network management device, the UE type is determined by the network management device according to the capability information of the UE, and the capability information of the UE is obtained from a live network and sent to the network management device by a base station; or the capability information of the UE is obtained by means of an IOT test and imported to the network management device; or both the foregoing two manners are used, that is, a part of the capability information of the UE is obtained by means of an IOT test and imported to the network management device, and a rest part is obtained from a live network and sent to the network management device by a base station.

When the base station independently determines the UE type of the UE by using the obtaining unit 420, the obtaining unit 420 determines the UE type according to the capability information of the UE, and the capability information of the UE may be obtained by the base station from the live network; or the network management device may send the capability information of the UE obtained by means of the IOT test to the base station; or certainly, the foregoing two manners may be combined, that is, the base station obtains a part of the capability information of the UE from the live network, and a rest part of the capability information of the UE is obtained by the base station from the network management device.

Generally, the base station may obtain the capability information of the UE from the live network by using one or both of the following messages: a UE capability information message in a process in which the UE initially accesses the base station and a handover preparation message in a process in which the UE accesses the base station by means of handover. For example, when the UE initially accesses the base station, the base station may receive, by using an air interface between the base station and the UE, the UE Capability Information message that carries the capability information of the UE; or when the UE accesses the base station by means of X2 handover, the base station may receive the capability information of the UE by using an X2 interface between the base station and a source base station; or when the UE accesses the base station by means of S1 handover, the base station may receive the capability information of the UE by using an S1 interface between the base station and an MME.

In a second manner, when a core network is allowed to deliver an IMEISV, the obtaining unit 420 may receive the IMEISV sent by a core network device and determine the UE type of the UE according to the Masked IMEISV.

In a third manner, the obtaining 420 may directly request an IMEI from the UE.

Each manner is the same as that of the foregoing descriptions, and details are not described herein.

Figure 15:
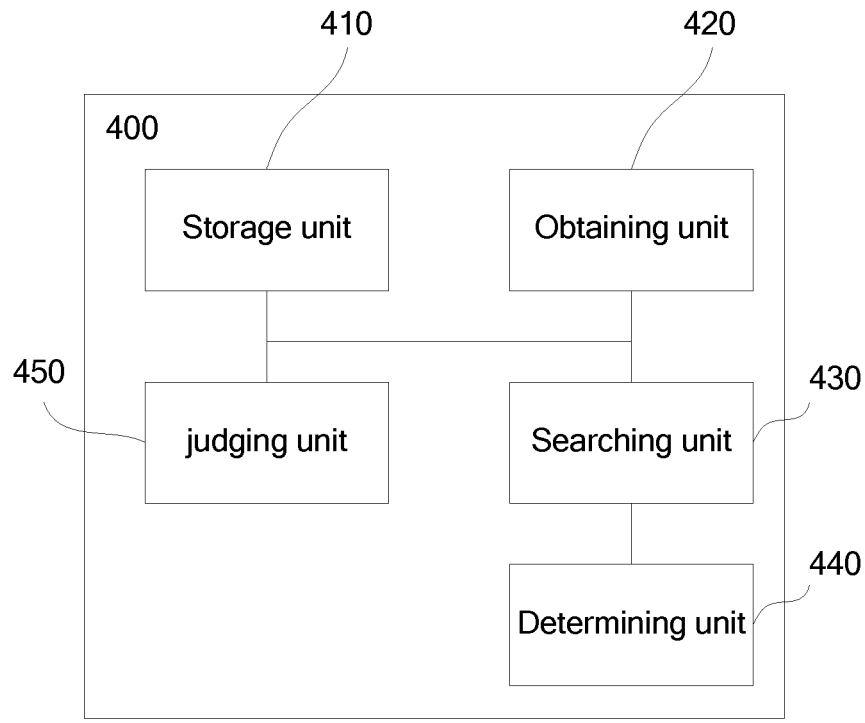
FIG. 15 is a schematic structural diagram of still another UE management device according to an embodiment of the present invention.

In addition, same as the foregoing descriptions, the network management device may collect capability information of multiple UEs to form a capability information table, and the network management device may send the table to the base station, so as to store the table in a storage unit 410. In this case, referring to FIG. 15, a device 400 further includes a judging unit 450, configured to: when the base station obtains the capability information of the UE from the live network, determine whether the capability information of the UE exists in the capability information table; and when the capability information of the UE does not exist in the capability information table, send the capability information of the UE to the network management device. In this way, the network management device can update the capability information table and maintain capability information of each UE.

In addition, same as the foregoing descriptions, a management list in may be established by the base station according to information delivered by the network management device, or may be directly delivered to the base station by the network management device.

Figure 16:
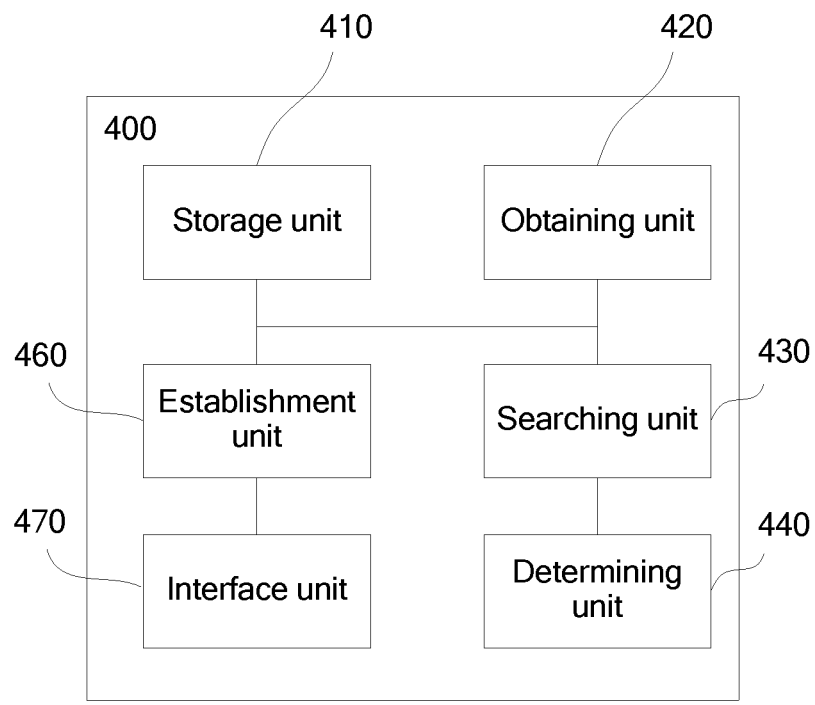
FIG. 16 is a schematic structural diagram of still another UE management device according to an embodiment of the present invention.

When the base station establishes the management list in, referring to FIG. 16, the device 400 further includes an establishment unit 460, configured to: receive a home list and a feature that are corresponding to the UE type and that are sent by the network management device, and establish the management list in according to the home list and the feature corresponding to the UE type. The home list and the feature may be simultaneously sent, or may be successively sent, and sending order is not limited. For example, the establishment unit 460 may first receive the home list sent by the network management device, and the home list refers to a home list corresponding to the UE type; and the establishment unit 460 may then receive the feature sent by the network management device, and the feature refers to a feature corresponding to each home list corresponding to the UE type. Certainly, the establishment unit 460 may first receive the feature sent by the network management device, and the feature refers to a feature corresponding to the UE type; and the establishment unit 460 may then receive the home list sent by the network management device, and the home list refers to a home list corresponding to each feature corresponding to the UE type. Generally, the establishment unit 460 may receive, by using an interface unit 470, information delivered by the network management device, and the interface unit 470 is an interface between the base station and the network management device.

When the network management device establishes the management list in, the interface unit 470 is configured to receive the management list sent by the network management device.

Generally, the interface unit 470 may receive, by using an operation and maintenance channel between the base station and the network management device, the home list and the feature that are corresponding to the UE type and that are sent by the network management device, or the management list sent by the network management device.

Figure 17:
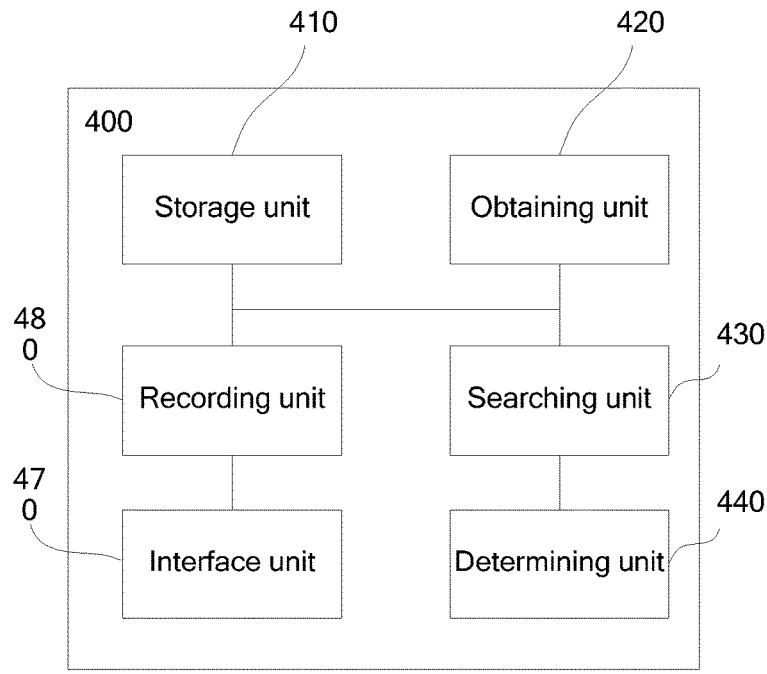
FIG. 17 is a schematic structural diagram of still another UE management device according to an embodiment of the present invention.

Referring to FIG. 17, optionally, the foregoing device 400 may include a recording unit 480, configured to record a log of the UE, and send a part or all of the recorded log to the network management device, so that the network management device determines, according to the part or all of the log, the feature and the home list corresponding to the UE type in the management list. That is, after the recording unit 480 records the log of the UE and sends the log to the network management device, the network management device may locate a problem of the UE according to the log, so as to configure the feature and the home list that need to be configured for the UE type of the UE.

Generally, the log of the UE may be obtained by executing a trace task. The trace task may be enabled by the recording unit 480 based on the UE type of the UE, and the log of the UE is recorded in the trace task by the recording unit 480; or the trace task is enabled by the core network device based on the UE type of the UE, and a trace identifier is established by the core network device, so as to trigger, by using the trace identifier, the recording unit 480 to record the log of the UE in the trace task.

Generally, the log recorded by the recording unit 480 may be recorded in the storage unit 410 and sent to the network management device by using the interface unit 470.

Figure 18:
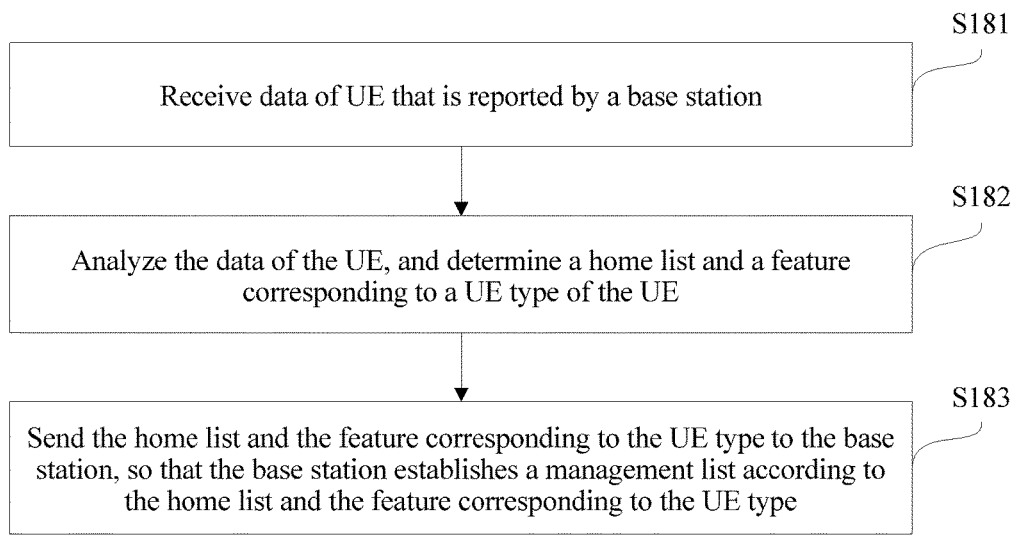
FIG. 18 is a flowchart of still another UE management method according to an embodiment of the present invention.

With reference to FIG. 18, a UE management method provided in an embodiment of the present invention is described in the following, and the method is performed by a network management device. The method includes the following steps:

S181. Receive data of UE that is reported by a base station.

S182. Analyze the data of the UE, and determine a home list and a feature corresponding to a UE type of the UE.

S183. Send the home list and the feature corresponding to the UE type to the base station, so that the base station establishes a management list according to the home list and the feature corresponding to the UE type.

Figure 19:
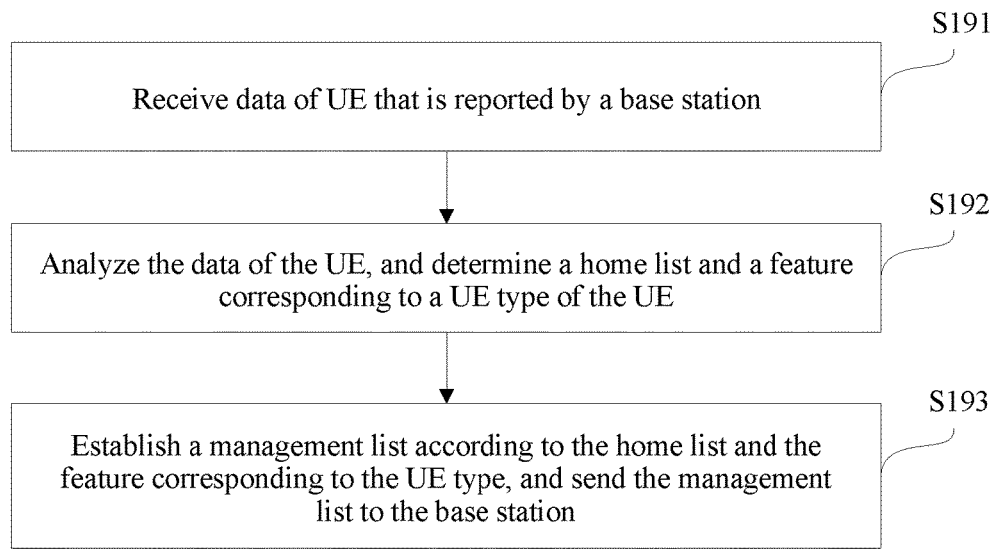
FIG. 19 is a flowchart of still another UE management method according to an embodiment of the present invention.

In the foregoing step S183, the network management device sends the home list and the feature corresponding to the UE type to the base station, and the base station establishes the management list. Same as the descriptions in the foregoing embodiments, the network management device may independently establish a management list and send the established management list to the base station. As shown in FIG. 19, this manner includes the following steps:

S191. Receive data of UE that is reported by a base station.

S192. Analyze the data of the UE, and determine a home list and a feature corresponding to a UE type of the UE.

S193. Establish a management list according to the home list and the feature corresponding to the UE type, and send the management list to the base station.

Figure 20:
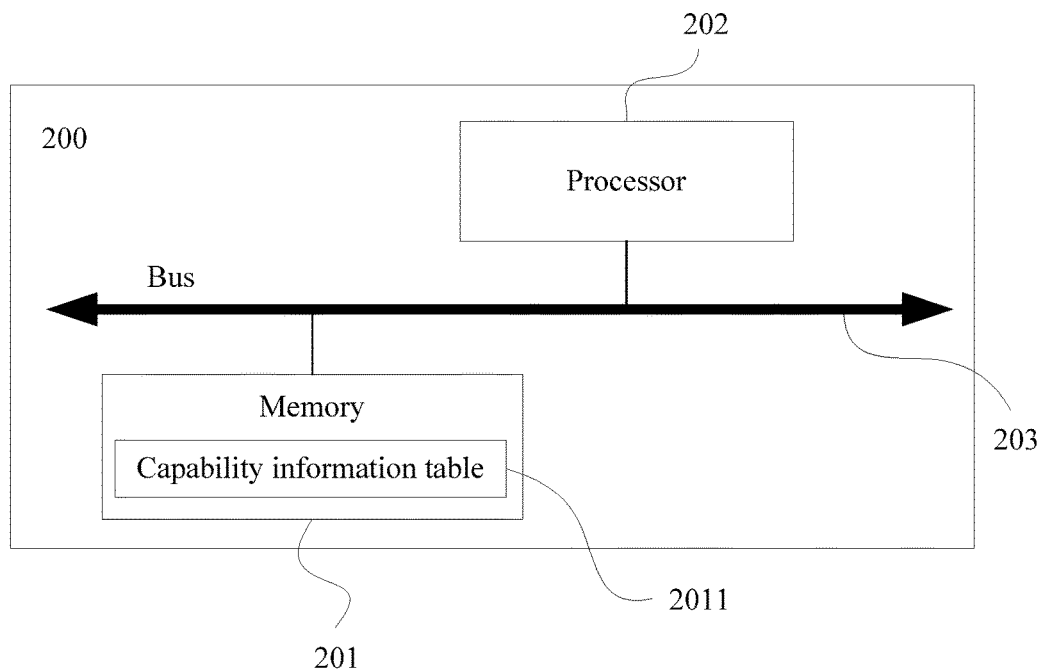
FIG. 20 is a schematic structural diagram of a network management device according to an embodiment of the present invention.

With reference to FIG. 20, a network management device 200 provided in an embodiment of the present invention is described in the following. As shown in FIG. 20, the network management device 200 includes a memory 201 and a processor 202, and the memory 201 and the processor 202 may be connected by using a bus 203. The memory 201 may be configured to store a capability information table maintained by the network management device. Same as the foregoing descriptions, the capability information table may include capability information of multiple UEs. A manner of obtaining the capability information is the same as that of the foregoing descriptions, and details are not described herein. The processor 202 is configured to execute an action performed by the network management device described in any one of the foregoing embodiments, for example, may be configured to execute the following operations:

analyzing data of UE that is reported by a base station, determining a home list and a feature corresponding to a UE type of the UE, and sending the home list and the feature corresponding to the UE type to the base station, so that the base station establishes a management list according to the home list and the feature corresponding to the UE type; or analyzing data of UE that is reported by a base station, determining a home list and a feature corresponding to a UE type of the UE, establishing a management list according to the home list and the feature corresponding to the UE type, and sending the management list to the base station.

Generally, the processor 202 may receive, by using an operation and maintenance channel between the base station and the network management device, the data of the UE that is reported by the base station.

In addition, the processor 202 may be further configured to establish or update a capability information table 2011.

In an example in which a management list includes a black list, the processor 202 may be configured to execute a process shown in FIG. 10. In an example in which a management list includes a white list, the processor 202 may be configured to execute a process shown in FIG. 12.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what is described above is merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A user equipment (UE) management method, comprising:
- obtaining, by a base station, a UE type of the UE, wherein the UE type of the UE is one of a type code for the UE or a model of the UE, wherein the base station stores a management list, and the management list comprises a listed UE type, a feature, and a home list, wherein each listed UE type corresponds to at least one feature, wherein each feature corresponding to each listed UE type is a function that UEs of the respective listed UE type are configured to execute, wherein each feature corresponding to each listed UE type corresponds to one home list, and wherein the home list indicates compatibility of execution, on a network of the base station, of the feature corresponding to the respective home list by UEs of a listed UE type corresponding to the home list and further indicates whether to allow the UEs of the listed UE type corresponding to the home list to execute the feature corresponding to the respective home list;
- searching, by the base station according to the obtained UE type of the UE, the management list for a found feature and a found home list corresponding to the listed UE type; and
- determining, by the base station according to the found home list corresponding to the found feature, whether to allow the UE to execute the found feature.

2. The method according to claim 1, wherein the UE type of the UE is the model of the UE and is determined according to capability information of the UE, wherein the capability information of the UE comprises a release, a category of a processing capability, a feature group indication, and frequency band information.

3. The method according to claim 2, wherein the obtaining, by the base station, the UE type of the UE comprises performing:
- receiving, by the base station, the UE type of the UE sent by a network management device, wherein the UE type of the UE is determined by the network management device according to the capability information of the UE; or
- obtaining, by the base station, the capability information of the UE, and determining the UE type of the UE according to the capability information of the UE.

4. The method according to claim 1, wherein the obtaining the UE type of the UE comprises:
- receiving a masked international mobile station equipment identity and software version (Masked IMEISV) of the UE that is sent by a core network device; and
- determining the UE type of the UE according to a type allocation code (TAC) of the UE in the Masked IMEISV, wherein the TAC in the Masked IMEISV is separate from a serial number (SNR) of the UE in the Masked IMEISV.

5. The method according to claim 1, further comprising:
- receiving, by the base station, a received home list and a received feature that correspond to the UE type and that are sent by a network management device; and
- generating, by the base station, the management list according to the received home list and the received feature.

6. The method according to claim 1, further comprising:
- receiving, by the base station, the management list sent by a network management device.

7. The method according to claim 1, further comprising:
- recording, by the base station, a log of the UE; and
- sending, by the base station, a part or all of recorded logs to a network management device, the sending the part or all of the recorded logs causing the network management device to determine, according to the part or all of the recorded logs, the found feature and the found home list corresponding to the UE type in the management list.

8. The method according to claim 1, wherein the home list in the management list comprises a black list, and a feature corresponding to the black list comprises a feature that is incompatible with the UE.

9. The method according to claim 1, wherein the home list in the management list comprises a white list, and a feature corresponding to the white list comprises a feature for improving user experience.

10. A device, wherein the device is located in a base station and configured to manage user equipment (UE) that accesses the base station, the device comprising:
- a processor; and
- a non-transitory computer-readable storage medium storing a program to be executed by the processor, and further storing a management list, wherein the management list comprises a listed UE type, a feature, and a home list, wherein each listed UE type corresponds to at least one feature, wherein each feature corresponding to each listed UE type is a function that UEs of the respective listed UE type are configured to execute, wherein each feature corresponding to each listed UE type corresponds to one home list, and wherein the home list indicates compatibility of execution, on a network of the base station, of the feature corresponding to the respective home list by UEs of a listed UE type corresponding to the home list and further indicates whether to allow the UEs of the listed UE type corresponding to the home list to execute the feature corresponding to the respective home list; the program comprising instructions for:
  - obtaining a UE type of the UE, wherein the UE type of the UE is one of a type code for the UE or a model of the UE;
  - searching the management list for a found feature and a found home list corresponding to the listed UE type according to the obtained UE type of the UE; and
  - determining whether to allow the UE to execute the found feature according to the found home list corresponding to the found feature.

11. The device according to claim 10, wherein the UE type of the UE is the model of the UE and is determined according to capability information of the UE, wherein the capability information of the UE comprises a release, a category of a processing capability, a feature group indication, and frequency band information.

12. The device according to claim 11, wherein the instructions for obtaining the UE type of the UE comprise instructions for performing at least one of:
- receiving the UE type of the UE sent by a network management device, wherein the UE type of the UE is determined by the network management device according to the capability information of the UE; or
- obtaining the capability information of the UE, and determining the UE type of the UE according to the capability information of the UE.

13. The device according to claim 10, wherein the instructions for obtaining the UE type of the UE comprise instructions for:

receiving a masked international mobile station equipment identity and software version (Masked IMEISV) of the UE that is sent by a core network device; and determining the UE type of the UE according to a type allocation code (TAC) of the UE in the Masked IMEISV, wherein the TAC in the Masked IMEISV is separate from a serial number (SNR) of the UE in the Masked IMEISV.

14. The device according to claim 10, wherein the program further includes instructions for:

receiving a received home list and a received feature that corresponding to the listed UE type and that are sent by a network management device; and establishing the management list according to the received home list and the received feature corresponding to the listed UE type.

15. The device according to claim 10, wherein the program further includes instructions for:

receiving the management list sent by a network management device.

16. The device according to claim 15, wherein the program further includes instructions for:

recording a log of the UE; and sending a part or all of recorded logs to the network management device, the sending a part or all of recorded logs to a network management device causing the network management device to determine, according to the part or all of the logs, the found feature and the found home list corresponding to the listed UE type in the management list.

17. The device according to claim 10, wherein the home list in the management list comprises a black list, and a feature corresponding to the black list comprises a feature that is incompatible with the UE.

18. The device according to claim 10, wherein the home list in the management list comprises a white list, and a feature corresponding to the white list comprises a feature for improving user experience.

19. A user equipment (UE) management device, wherein the device is located in a network management device, the UE management device comprising:

a processor; and a non-transitory computer-readable storage medium storing a program to be executed by the processor, the program including instructions for:

receiving data of UE that is reported by a base station;

analyzing the data of the UE, and determining a home list and a feature corresponding to a UE type of the UE, wherein the UE type of the UE is one of a type code for the UE or a model of the UE; and generating a management list according to the home list and the feature corresponding to the UE type of the UE, and sending the management list to the base station, wherein the management list comprises a listed UE type, a feature, and a home list, wherein each listed UE type corresponds to at least one feature, wherein each feature corresponding to each listed UE type is a function that UEs of the respective listed UE type are configured to execute, wherein each feature corresponding to each listed UE type corresponds to one home list, and wherein the home list indicates compatibility of execution, on a network of the base station, of the feature corresponding to the respective home list by UEs of a listed UE type corresponding to the home list and further indicates whether to allow the UEs of the listed UE type corresponding to the home list to execute the feature corresponding to the respective home list.

20. The device according to claim 19, wherein the home list in the management list comprises a black list wherein a feature corresponding to the black list comprises a feature that is incompatible with the UE, or a white list wherein a feature corresponding to the white list comprises a feature for improving user experience.

* * * * *